(12) United States Patent
Beringer et al.

(10) Patent No.: US 8,712,953 B2
(45) Date of Patent: Apr. 29, 2014

(54) DATA CONSUMPTION FRAMEWORK FOR SEMANTIC OBJECTS

(75) Inventors: Joerg Beringer, Los Altos, CA (US);
Kai S. Richter, Muehltal-Traisa (DE);
Reiner P. Hammerich, Rauenberg (DE);
Dominik R. Tornow, Palo Alto, CA (US)

(73) Assignee: SAP AG, Walldorf (DE)

( * ) Notice: Subject to any disclaimer, the term of this patent is extended or adjusted under 35 U.S.C. 154(b) by 127 days.

(21) Appl. No.: 12/411,216

(22) Filed: Mar. 25, 2009

(65) Prior Publication Data

US 2010/0251129 A1 Sep. 30, 2010

(51) Int. Cl.
*G06F 7/00* (2006.01)
*G06F 17/00* (2006.01)
*G06F 3/048* (2013.01)

(52) U.S. Cl.
USPC .......................... 707/600; 715/738

(58) Field of Classification Search
None
See application file for complete search history.

(56) References Cited

U.S. PATENT DOCUMENTS

| | | | |
|---|---|---|---|
| 4,617,643 A | 10/1986 | Klock et al. | |
| 4,777,485 A | 10/1988 | Costello | |
| 4,845,644 A | 7/1989 | Anthias et al. | |
| 5,040,131 A | 8/1991 | Torres | |
| 5,197,124 A | 3/1993 | Busboom et al. | |
| 5,201,033 A | 4/1993 | Eagen et al. | |
| 5,208,903 A | 5/1993 | Curry | |
| 5,214,756 A | 5/1993 | Franklin et al. | |
| 5,255,358 A | 10/1993 | Busboom et al. | |
| 5,295,241 A | 3/1994 | Eagen et al. | |
| 5,345,553 A | 9/1994 | Busboom et al. | |
| 5,388,198 A | 2/1995 | Layman et al. | |
| 5,430,836 A | 7/1995 | Wolf et al. | |
| 5,461,716 A | 10/1995 | Eagen et al. | |
| 5,467,441 A | 11/1995 | Stone et al. | |
| 5,517,405 A | 5/1996 | McAndrew et al. | |
| 5,596,690 A | 1/1997 | Stone et al. | |
| 5,652,851 A | 7/1997 | Stone et al. | |
| 5,682,169 A | 10/1997 | Botterill et al. | |
| 5,710,896 A | 1/1998 | Seidl | |
| 5,727,141 A | 3/1998 | Hoddie et al. | |
| 5,729,704 A | 3/1998 | Stone et al. | |
| 5,754,857 A | 5/1998 | Gadol | |
| 5,826,239 A | 10/1998 | Du et al. | |
| 5,923,330 A | 7/1999 | Tarlton et al. | |
| 5,940,075 A | 8/1999 | Mutschler et al. | |
| 5,991,733 A | 11/1999 | Aleia et al. | |
| 6,073,109 A | 6/2000 | Flores et al. | |

(Continued)

OTHER PUBLICATIONS

Cardoso, Jorge, "Semantic Web Services: Theory, Tools and Applications", *Information Science Reference*, Hershey, NY, USA, 2007, (2007), 1-43 and 191-239.

(Continued)

*Primary Examiner* — Rehana Perveen
*Assistant Examiner* — Raheem Hoffler
(74) *Attorney, Agent, or Firm* — Blakely Sokoloff Taylor & Zafman, LLP

(57) ABSTRACT

A data enrichment and consumption framework enables defining data object consumption based on semantic aspects of the data object. Views, contexts, and associations of the data object are defined to dynamically render UI content based on interaction with the data object. Additionally, standard views can be defined to enable rapid development of UIs. The same data content is rendered in consistent ways across different devices and UI technologies.

20 Claims, 14 Drawing Sheets

(56) References Cited

U.S. PATENT DOCUMENTS

| | | | |
|---|---|---|---|
| 6,100,885 A | 8/2000 | Donnelly et al. |
| 6,137,484 A | 10/2000 | Hoddie et al. |
| 6,209,004 B1 | 3/2001 | Taylor |
| 6,282,531 B1 | 8/2001 | Haughton et al. |
| 6,343,271 B1 | 1/2002 | Peterson et al. |
| 6,434,628 B1 | 8/2002 | Bowman-Amuah |
| 6,640,238 B1 | 10/2003 | Bowman-Amuah |
| 6,968,553 B1 | 11/2005 | Theeten |
| 6,973,618 B2 | 12/2005 | Shaughnessy et al. |
| 6,988,272 B1 | 1/2006 | Iwao et al. |
| 7,000,219 B2 | 2/2006 | Barrett et al. |
| 7,096,222 B2 | 8/2006 | Kern et al. |
| 7,100,195 B1 | 8/2006 | Underwood |
| 7,167,844 B1 | 1/2007 | Leong et al. |
| 7,219,107 B2 | 5/2007 | Beringer |
| 7,412,658 B2 | 8/2008 | Gilboa |
| 7,425,582 B2 | 9/2008 | Baran, Jr. et al. |
| 7,428,582 B2 | 9/2008 | Bean et al. |
| 7,451,152 B2 | 11/2008 | Kraft et al. |
| 7,603,266 B2 | 10/2009 | Ramanathan |
| 7,698,656 B2 | 4/2010 | Srivastava |
| 7,769,619 B1 | 8/2010 | Krysinski et al. |
| 7,860,946 B1 | 12/2010 | Bulleit et al. |
| 7,876,779 B2 | 1/2011 | Wilson |
| 7,917,378 B2 | 3/2011 | Fitzgerald et al. |
| 7,925,527 B1 | 4/2011 | Flam |
| 8,127,237 B2 | 2/2012 | Beringer |
| 8,135,817 B2 | 3/2012 | Motoyama |
| 8,271,882 B2 | 9/2012 | Botscheck et al. |
| 8,321,243 B1 | 11/2012 | Harris, Sr. et al. |
| 8,489,415 B1 | 7/2013 | Ringold |
| 8,526,925 B2 | 9/2013 | Zellner et al. |
| 2002/0063734 A1 | 5/2002 | Khalfay et al. |
| 2002/0107752 A1 | 8/2002 | Rivera et al. |
| 2003/0023472 A1 | 1/2003 | Lee et al. |
| 2003/0036925 A1 | 2/2003 | Miller |
| 2003/0046639 A1 | 3/2003 | Fai et al. |
| 2003/0172343 A1 | 9/2003 | Leymaster et al. |
| 2003/0182458 A1 | 9/2003 | Ali et al. |
| 2003/0217333 A1 | 11/2003 | Smith et al. |
| 2004/0015893 A1 | 1/2004 | Banavar et al. |
| 2004/0046789 A1 | 3/2004 | Inanoria |
| 2004/0225571 A1 | 11/2004 | Urali |
| 2004/0236858 A1 | 11/2004 | Schwartz |
| 2004/0261017 A1 | 12/2004 | Perry |
| 2005/0027544 A1 | 2/2005 | Newstead et al. |
| 2005/0027559 A1 | 2/2005 | Rajan et al. |
| 2005/0203757 A1 | 9/2005 | Lei et al. |
| 2005/0257139 A1 | 11/2005 | Burst et al. |
| 2006/0047709 A1 | 3/2006 | Belin et al. |
| 2006/0085245 A1 | 4/2006 | Takatsuka et al. |
| 2006/0101321 A1 | 5/2006 | Friedrichowitz et al. |
| 2006/0133412 A1 | 6/2006 | Callaghan |
| 2006/0149743 A1 | 7/2006 | Mouline et al. |
| 2006/0190544 A1 | 8/2006 | Chikirivao et al. |
| 2006/0200792 A1 | 9/2006 | Hagstrom et al. |
| 2006/0224432 A1 | 10/2006 | Li |
| 2006/0230348 A1 | 10/2006 | Fahmy |
| 2006/0244089 A1 | 11/2006 | Sawada et al. |
| 2006/0247965 A1 | 11/2006 | Griffith et al. |
| 2006/0277089 A1 | 12/2006 | Hubbard et al. |
| 2007/0033194 A1 | 2/2007 | Srinivas et al. |
| 2007/0033571 A1 | 2/2007 | Moore et al. |
| 2007/0054627 A1 | 3/2007 | Wormald |
| 2007/0055560 A1 | 3/2007 | Quinn |
| 2007/0150480 A1 | 6/2007 | Hwang et al. |
| 2007/0192630 A1 | 8/2007 | Crane et al. |
| 2007/0239503 A1 | 10/2007 | Bhatnagar et al. |
| 2007/0299828 A1 | 12/2007 | Lewis et al. |
| 2007/0300185 A1 | 12/2007 | Macbeth et al. |
| 2008/0004725 A1 | 1/2008 | Wacker |
| 2008/0082649 A1* | 4/2008 | Gazier et al. ............ 709/223 |
| 2008/0140759 A1* | 6/2008 | Conner et al. ............ 709/201 |
| 2008/0215757 A1 | 9/2008 | Hellstrom |
| 2008/0313650 A1 | 12/2008 | Arnquist et al. |
| 2009/0031284 A1 | 1/2009 | Shenfield et al. |
| 2009/0044236 A1 | 2/2009 | Bendiabdallah et al. |
| 2009/0051701 A1 | 2/2009 | Fleming |
| 2009/0063522 A1 | 3/2009 | Fay et al. |
| 2009/0083058 A1 | 3/2009 | Beringer et al. |
| 2009/0106645 A1 | 4/2009 | Knobel |
| 2009/0112924 A1 | 4/2009 | Harris et al. |
| 2009/0158268 A1 | 6/2009 | Pichetti et al. |
| 2009/0171909 A1 | 7/2009 | Bank et al. |
| 2009/0235167 A1* | 9/2009 | Boyer et al. ............ 715/708 |
| 2009/0240840 A1 | 9/2009 | Habben et al. |
| 2009/0241015 A1 | 9/2009 | Bender et al. |
| 2009/0260022 A1 | 10/2009 | Louch et al. |
| 2010/0049628 A1* | 2/2010 | Mannava et al. ............ 705/27 |
| 2010/0050097 A1 | 2/2010 | McGreevy et al. |
| 2010/0064229 A1 | 3/2010 | Lau et al. |
| 2010/0082641 A1 | 4/2010 | Rinckes et al. |
| 2010/0125477 A1* | 5/2010 | Mousseau et al. ............ 705/7 |
| 2010/0174991 A1* | 7/2010 | Andersen et al. ............ 715/738 |
| 2010/0251133 A1 | 9/2010 | Beringer et al. |

OTHER PUBLICATIONS

Davies, John, et al., "Towards the Semantic Web Ontology-Driven Knowledge Managements", *John Wiley & Sons, LTD*, Chichester, England, 2003, (2003), 1-12 and 91-115.
Shadbolt, Nigel, et al., "The Semantic Web Revisited", *IEEE Intelligent Systems* May/Jun. 2006; Retrieved on Mar. 1, 2009 from http://eprints.ecs.soton.ac.uk/12614/01/Semantic_Web_Revisited.pdf Published by the IEEE Computer Society, 2006:, pp. 96-101.
Spivack, Nigel, "Making Sense of the Semantic Web", Nov. 2007; Retrieved from the Web on Mar. 11, 2009; http://novaspivack.typepad.com/nova_spivacks_weblog/files/nova_spivack_semantic_web_talk.ppt, 36 pages.
Non-Final Office Action for U.S. Appl. No. 11/956,086 Mailed Jun. 8, 2010, 19 Pages.
Office Action from U.S. Appl. No. 12/128,453 mailed Oct. 4, 2010, 23 pages.
Final Office Action for U.S. Appl. No. 11/956,086 Mailed Nov. 24, 2010, 26 Pages.
Non-Final Office Action for U.S. Appl. No. 11/803,760 Mailed Dec. 7, 2010, 24 Pages.
Office Action from U.S. Appl. No. 12/128,453 mailed Jan. 10, 2011, 17 pages.
Non-Final Office Action for U.S. Appl. No. 12/033,361, Mailed Feb. 17, 2011, 13 pages.
Final Office Action for U.S. Appl. No. 11/803,760, Mailed Apr. 1, 2011, 26 pages.
Non-Final Office Action for U.S. Appl. No. 12/128,453, Maiied Apr. 26, 2011, 17 pages.
Non-Final Office Action for U.S. Appl. No. 12/411,231, Mailed Jun. 9, 2011, 33 pages.
Ivor Horton's Beginning Visual C++ published by Wiley Publishing, Inc. Copyright 2006.
Fingar, "Missing Link", bpminstitute.org, (Jan. 5, 2006), 1.
Fingar, "The Coming IT Flip Flop: And the Emergence of Human Interaction Management Systems", BPTrends, (Nov. 2005), 1-5.
Harrison-Broninski, "Human Interaction: The Missing Link in BPM (Part 1)", ebizQ.net, (Apr. 3, 2005), 1-3.
Harrison-Broninski, "Human Interaction: The Missing Link in BPM (Part II)", ebizQ.net, (Apr. 10, 2005), 1-3.
Hollingsworth, David, "Workflow Management Coalition the Workflow Reference Model", Document No. TC00-1003, Document Status—Issue 1.1, Jan. 19, 1995, 55 Pages.
Final Office Action for U.S. Appl. No. 12/033,361, Mailed Aug. 3, 2011, 7 pages.
Notice of Allowance for U.S. Appl. No. 12/128,453, Mailed Aug. 30, 2011, 14 pages.
Notice of Allowance for U.S. Appl. No. 12/033,361, Mailed Oct. 27, 2011.
Final Office Action for U.S. Appl. No. 11/803,760, Mailed Oct. 31, 2011.
Final Office Action for U.S. Appl. No. 12/411,231, Mailed Nov. 9, 2011, 32 pages.

(56) References Cited

OTHER PUBLICATIONS

Restriction Requirement for U.S. Appl. No. 11/803,831 Mailed Mar. 25, 2011, 11 Pages.
Non-Final Office Action for U.S. Appl. No. 11/803,751, Mailed Mar. 15, 2011, 11 pages.
Non-Final Office Action for U.S. Appl. No. 11/803,831, Mailed May 16, 2011, 20 pages.
Non-Final Office Action for U.S. Appl. No. 11/803,760, Mailed Jul. 20, 2011, 26 pages.
Final Office Action for U.S. Appl. No. 11/803,751, Mailed Aug. 17, 2011, 16 pages.
Final Office Action from U.S. Appl. No. 11/803,831 mailed Sep. 20, 2011, 19 pages.
Office Action from U.S. Appl. No. 12/411,231 mailed Mar. 28, 2012, 37 pages.
Notice of Allowance from U.S. Appl. No. 11/956,086 mailed Feb. 2, 2012, 8 pages.
Office Action from U.S. Appl. No. 11/803,831 mailed Apr. 17, 2012, 19 pages.
Office Action from U.S. Appl. No. 11/803,760 mailed Oct. 15, 2010, 8 pages.
Advisory Action from U.S. Appl. No. 11/803,760 mailed May 31, 2011, 3 pages.
Advisory Action from U.S. Appl. No. 11/956,086 mailed Feb. 7, 2011, 4 pages.
Final Office Action from U.S. Appl. No. 12/411,231 mailed Jul. 17, 2012, 46 pages.
Office Action from U.S. Appl. No. 12/411,231 mailed Jul. 16, 2013, 46 pages.
Roper, Chris, GDC 09: OnLive Introduces the Future of Gaming, Next-generation "cloud" technology could change videogames forever, http://www.ign.com/articles/2009/03/24/gdc-09-onlive-introduces-the-future-of-gaming, Mar. 23, 2009, 6 pages.
"Notice of Allowance for U.S. Appl. No. 13/358,725", (Dec. 19, 2013), Whole Document.
"Office Action from U.S. Appl. No. 13/358,725", (Jun. 21, 2013), Whole Document.

* cited by examiner

```
UX OBJECT TEMPLATE
1110

UXList{
  // generic operation
  Operation Select(record){
    selectedItem = record;
  }
  // generic outport
  Outport Selected{
    return selectedItem;
  }
}

UXFactSheet{
  // generic inport
  Inport CurrentObject{
    currentObject = value;
  }
}
```

```
UX OBJECT 1120

EmployeeList: UXList{
  // assign standard view
  data = employee.ListView
}

EmployeeFactSheet:
UXFactSheet{
  // only accept Employees
  employee =
    (Employee)currentObject;

// assign standard view
  data = employee.Overview
}
```

```
UX APPLICATION 1130

EmployeeApplication:
UXApplication{
  // reference to the UXO
  EmployeeList eList;
  EmployeeFactsheet eFS;

// link the ports
  link(eList.Selected,
    eFS.CurrentObject)
}
```

```
CLIENT DATA 1140

EmployeeApplication{
  EmployeeList{
    fields{
      // assign data to fields
    }
    operations{
      // inherited from
      // template
      Selected
    }
    data{
      employee1
      employee2
      employee3
    }
  }
  EmployeeFactSheet{
    fields{}
    operations{}
    data{}
  }
}
```

FIG. 11

UX OBJECT TEMPLATE 1210

```
UXList{
  // generic operation
  Operation Select(record){
    selectedItem = record;
  }
  // generic outport
  Outport Selected{
    return selectedItem;
  }
}

UXForm{
  // generic inport
  Inport CurrentObject{
    currentObject = value;
  }
}
```

UX OBJECT 1220

```
CountryList: UXList{
  // only accept Country
  country =
    (Country)currentObject;

// assign standard view
  data = country.ListView;
}

AddressForm: UXForm{
  // only accept address
  address =
    (Address)currentObject;

// assign standard view
  data = address.EditView;

// set mapping operation
  // visible if in US
  if(address.country == US) //
    @visible=true
    ShowOnMap();
  } else {
    //@visible=false
    ShowOnMap();
  }
}
```

UX APPLICATION 1230

```
AddressApplication:
  UXApplication{
  // reference to the
  // UXO
  CountryList cList;
  AddressForm aForm;

// link the ports
  // get the address for
  // a country to put it
  // into the form
  link(
    cList.Selected.GetAddress,
    aForm.CurrentObject
  )
}
```

CLIENT DATA 1240

```
AddressApplication{
  CountryList{
    fields{
      // assign data to
      // fields
    }
    operations{
      // inherited from
      // template
      Selected
    }
    data{
      country1
      country2
      country3
    }
  }
  AddressForm{
    fields{
      // US address field
      // as default
    }
    operations{}
    data{}
  }
}
```

UX OBJECT TEMPLATE
1310

UXBusinessCard{}

UXList{}

UXMultiFacet{
  // generic facet container
  UXObjects[] facets;

// define the lead object
  // for this multifacet
  Inport LeadObject{
    leadObject = value;
  }

// generic outport
  Outport ActiveFacet{
    return activeFacet;
  }
}

UX OBJECT 1320

EmployeeBusinessCard:
UXBusinessCard{}

EmployeeList: UXList{}

EmployeeInspect: MultiFacet{
  // Define Facets
  OverviewFacet =
    EmployeeBusinessCard
  DirectReports =
    EmployeeList
}

UX APPLICATION 1330

EmployeeApplication:
UXApplication{
  // reference to the UXO
  EmployeeInspect eInspect;
}

CLIENT DATA 1340

AddressApplication{
  EmployeeInspect{
    fields{
      // segment by Facets
      OverviewFacet:
      // assign data
      DirectReports:
    }
    operations{
      // inherited from
      // template
      ActiveFacet
    }
    data{
      employee1
      employee2
      employee3
    }
  }
}

UX OBJECT TEMPLATE
1410

UXBusinessCard{}

UXList{
 // UI-specific action
 Operation Selected{}
}

UX OBJECT 1420

EmployeeList: UXList{
 // Employee Action exposed
 Operation Promote(){
  (Employee)current.promote();
 }
 // Framework Action
 Operation Delete(){
  (Object)current.delete();
 }
}

UX APPLICATION 1430

EmployeeApplication:
 UXApplication{
  // reference to the UXO
  EmployeeList eList;
 }

CLIENT DATA 1440

AddressApplication{
 EmployeeList{
  fields{
   // assign data
  }
  operations{
   // all actions are
   // treated the same
   Selected()
   Promote()
   Delete()
  }
  data{
   employee1
   employee2
   employee3
  }
 }
}

FIG. 14

DATA CONSUMPTION FRAMEWORK FOR SEMANTIC OBJECTS

FIELD

Embodiments of the invention are related generally to data access and presentation, and embodiments of the invention are more particularly related to a framework for dynamic access and display of data content through semantic definitions and relationships.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2008, SAP AG, All Rights Reserved.

BACKGROUND

The emergence of service-oriented architecture (SOA) in the enterprise enables data to be accessed as a bundle of resources available through services rather than a bound together as a monolithic transaction or application. When implementing user interfaces on SOA platforms, the data services provided by the platform are composed into data displays tailored to a specific usage context. To develop usable data displays with appropriate content and user interaction, the developer has to have expertise not only in front end design, but also in accessing and composing low level services exposed by ERP platforms. However, the access and display of data content occurs through multiple different channels or devices, each of which may render the data content differently. Each device or application has traditionally been developed separately, where each access to data is defined specifically in relation to the device or UI technology in which the data is presented. Presenting the data in a different application or different device generally allows only minimal reuse of code and the mapping of services into consumable data presentations has to be redone within every new target consumer technology (device and/or UI technology).

MVC (model-view-controller) architectures are commonly used, ostensibly for separating the modeling of the data, from the logic to control data flow, from the display or presentation of the data. However, in reality the layers are actually dependent on one another in current implementations because the MVC pattern is associated with one specific UI component residing in one specific technical stack, which reduces portability between different UI technologies, local MVC stacks do not support developmental reuse across user interfaces and devices.

Additionally, the service composition tools to build UIs are generally focused on design times defining UIs fixed in content and functionality based on what was perceived as desirable functionality at the time of designing the UI. The ability to customize the resulting packaged UI to a specific context of use has been impractical, and the user interface cannot be transformed to devices that require a structurally different native user experience. Thus, the content and the representation of data which are created with large investment and a great deal of expertise are not consumable other than on one specific target platform.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 11 illustrates pseudo-code examples of the implementation of ports.

FIG. 12 illustrates pseudo-code examples of the implementation of dependencies.

FIG. 13 illustrates pseudo-code examples of the implementation of facets.

FIG. 14 illustrates pseudo-code examples of the implementation of actions.

Figure 1:
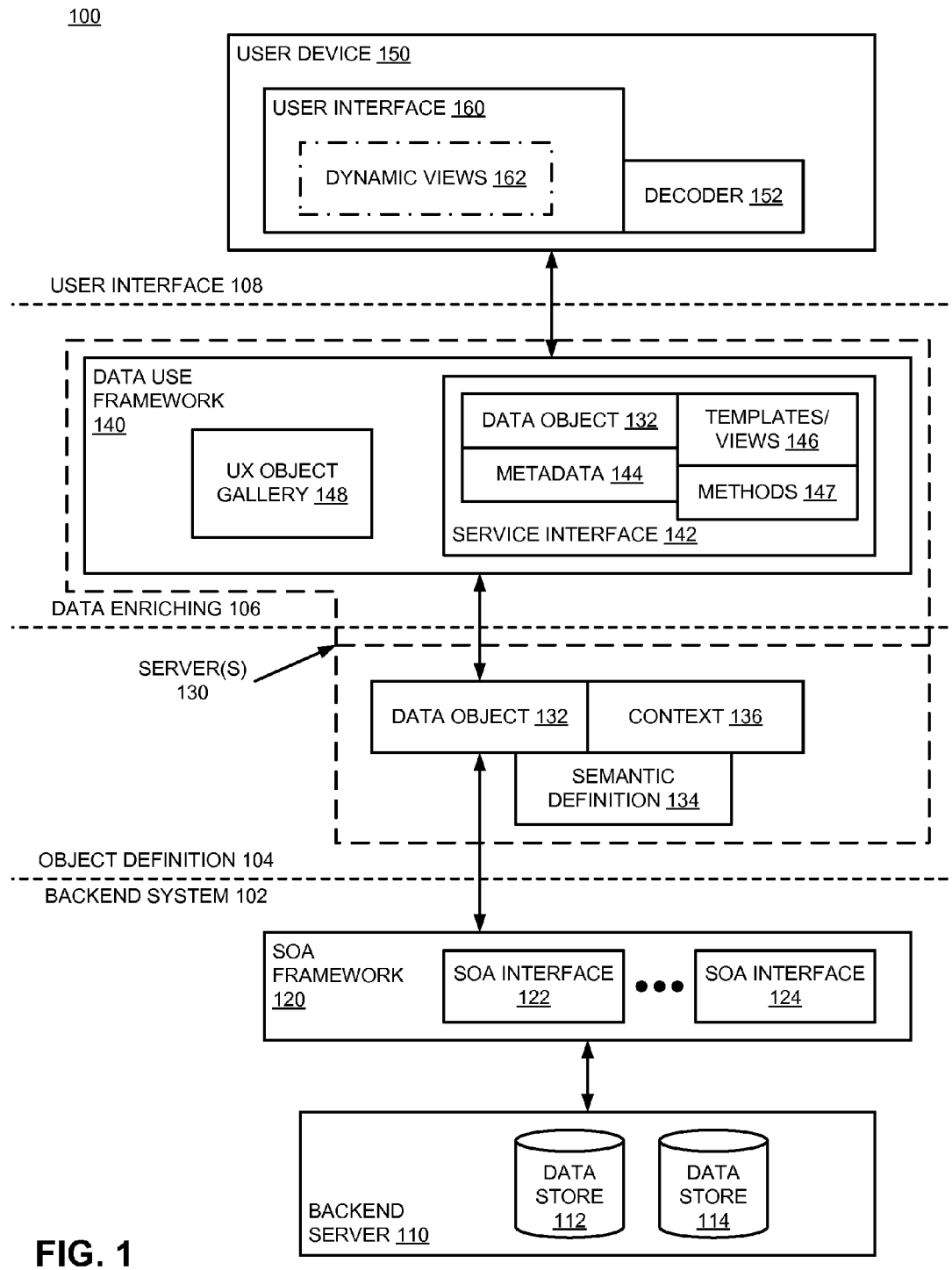
FIG. 1 is a block diagram of an embodiment of a system having a data use or data consumption framework.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a user experience object is generated that provides a user-device agnostic service interface, reusable across different user devices and applications. The user experience object allows a consistent user experience across different technologies and different devices. A data object is defined semantically within a service oriented architecture (SOA) network, and enriched with definitions of how the data is to be consumed. Metadata descriptions about associations and access to the data content as well as how the content is to be viewed are associated with the data object. From the data object and the definitions, a framework generates an enriched semantic data object having the metadata descriptions, and service definitions for the semantic data object. Applications are compositions of user experience objects that request data via the semantic data objects leveraging the meta descriptions to facilitate consumption.

In one embodiment, consider a multi-layer approach to providing data to be viewed and accessed in a user interface (UI), where a first layer involves semantically modeling data that is relevant for the user experience, and a second layer involves defining consumption of the data. The first layer includes semantic definitions or semantic object models that represent semantic definitions that describe access to or description of data content for a business scenario for consumption by end users. The description includes projections, mappings, enrichments, and/or associations, which support the access to related information. The definitions incorporate the knowledge of business domains into the semantic object. Thus, experience suggests how end-users expect to be able to access data, what they expect the data to show, and what they expect to be able to do with the data. Such domain knowledge is accounted in the definition of the semantic object. The resulting semantic object is thus modeled semantically, basically defining the contents of the UX object by the expectations (i.e., what the object "should mean" from the perspective of its users), rather than simply what contents a developer thinks the object should have. Such expectations are met by data access through services of the SOA.

The definition of a semantic object can be contrasted with definition of a traditional object, which only describes the "technical characteristics" and which persists data in the backend and supports application logic. The traditional object is defined in terms of its technical contents, and use and access of the data is limited to interaction with the technical contents. The semantic object includes the technical contents enhanced by semantic definitions of how the contents are to be used in different situations. The different situations are relevant for providing UI definitions to define interactions with the data contents. Thus, the semantic object may also be referred to as a "semantic view," referring to the definition of the object in light of its contextual uses. It will be understood that there can be many semantic views on the same technical content. Thus, multiple, different semantic views allow definitions for different contexts of use. It will further be understood that reference herein to enriching the data object refers to defining transformations on existing data, such as via mappings and projections, rather than simply adding data (e.g., adding logos, defining characteristics).

Where the semantic object and its contents may be understood as a first layer, the second layer defines consumption of the data. The data consumption layer enriches the data object definition with context more specific to a UI scenario. Thus, enriching the semantic object to generate a UX object as described herein refers to adding definitions that define the consumption of the data contents that the semantic data object has. The enriching may or may not add additional technical content to the data object. The enriching is more about the definition of associations, views, and possibly navigation associated with the semantic object in different scenarios. The UI development can be made to "consume" the metadata that enriches the semantic or contextual object, and interact with the service interfaces of the UX object to define and render the UI.

The consumption layer defines the consumption in the form of UX objects, which are abstract service components representing the behavior of building blocks used in the UI context. The abstract building blocks may be UI patterns and/or UI frames with one or more types of standard views that can be inserted in to the patterns, and may include abstract navigation patterns. UX objects can also model archetypes for complex design patterns like inbox, context inspection, KPI (key performance indicator) dashboard, faceted data navigation, search, etc., that have UI patterns and standard view types related to the contexts. Such higher level UX objects can also be compositions of atomic UX objects, but add behaviors specific to context of use.

UX objects are bound to data content provided in the semantic view layer at design time or at runtime. UX objects can be used as is or tailored to a specific context of use or business entity. If used as is, the resulting application can be consumed in a declarative way by all consumers that implement decoders to interpret the behavior of such standard UX objects. If customized, UX objects are deployed as runtime components to consumers to provide behavior beyond default behavior at runtime. UX objects are agnostic to the rendering technology and describe behavior in an abstract way, which allows consumers to implement very different presentations and user interaction that conform to the native user experience of the target device or UI technology.

Data content in the semantic view layer is accessed from UX objects via "usages." A usage is one specific projection on the generic semantic view, and may be referred to as a "standard view." The concept of usages segregates the duty of modeling data according to best practices of a domain (e.g., a business domain, such as a view on a business partner, product, employee, etc., as consumed by users), from defining the actual usage used in context of one UX object. For example, the business entity "supplier" may be modeled as a semantic data object based on technical "Business Partner" entity in an ERP (enterprise resource planning) platform. Usages define what aspect of the semantic "Supplier" data object are actually used if the supplier is consumed in form of a thumbnail, list, or factsheet, for example. Some usages, such as short identifier, line item, single factsheet, multi-facet factsheet, can be standardized and provided as part of the semantic view model. UX objects request data with one of these default usages to ensure default content at design or runtime. Default usages can be overwritten or defined as needed at design time by the developer, during customization by the power user or business analyst, and by the end user through personalization.

UX objects provide in-bound and out-bound ports to standardize composition at design or runtime. Compositions typically define navigation patterns such as master/detail, drill down, faceted inspection, open entity, follow association, launch, display related items, etc. The enablement of such a navigation is normally a major development investment specific to one screen or front end technology. However, with enriched objects as described herein, data flow resides in the UX consumption layer and can be re-used by any consumer. Building a navigational controller usually requires in-depth knowledge about a database (e.g., the ERP platform). In contrast, the data navigation from the navigation patterns described herein is processed by the semantic view layer based on metadata defining associations.

For example, a developer or business analyst can tailor a "List" UX object to display all direct reports of a manager. The resulting "Team List" UX Object would provide special functions for browsing employees and providing functions to manipulate teams and inspect employee or team properties that are relevant for the application context, e.g., aggregated statistics about average age, salary, etc. The packaged component can be deployed to consumers that provide a runtime for UX objects. Even without deployment, consumers that implement decoders for default UX objects can provide the core functionality of the non-customized UX objects. For example, a manager would be able to browse the team as a generic list with employees as line items on a mobile device without having the additional functions available. Abstract navigation patterns may define navigation based on associations or relations between objects and/or actions, and allows dynamic rendering of content based on what interaction occurs with the end user. For example, the user can open a line item (the direct report) using the "object inspection" UX object to view details of a particular employee. Alternatively, the user can navigate to current projects the employee is involved in, if such an association is provided in the semantic view layer.

MVC architectures have traditionally only provide for end-user semantic understanding in specific presentation and/or channel-specific UI design. In contrast, UX objects decouple the modeling of end-user related semantic understanding from the presentation or channel specific layer and allow very quick construction of applications from UI component building blocks. Reference to different channels refers to the concept of data access in various different technical containers on a single device, and/or data access on different device types (e.g., mobile phone versus a laptop computer). The UI building blocks are abstract from the perspective of the presentation layer, which allows for the UI building blocks to decouple the definition of concrete content and role-dependent views from the presentation layer. In one embodiment, content templates according to the UX objects described herein can be the model (M) aspect of a traditional MVC UI pattern. Alternatively, the content templates may be consumed by an active client decoder that has interfaces to directly process and use the data on the native technology or device capabilities.

MVC architectures have traditionally only provide for end-user semantic understanding in specific presentation and/or channel-specific UI design. In contrast, UX objects decouple the modeling of end-user related semantic understanding from the presentation or channel specific layer and allow very quick construction of applications from UI component building blocks. Reference to different channels refers to the concept of data access in various different technical containers on a single device, and/or data access on different device types (e.g., mobile phone versus a laptop computer). The UI building blocks are abstract from the perspective of the presentation layer, and decoupled from the definition of concrete data content and role-dependent views. In one embodiment, default usages of semantic data objects in the context of UX objects described herein can be the model (M) and controller (C) aspect of a traditional packaged MVC UI pattern. Alternatively, the default usages and standard UX Objects may be consumed by an active client decoder that has interfaces to directly process and use the data stream on the native technology or device capabilities.

In one embodiment, UX objects and their service interfaces are made available in proprietary integrated development environments (IDEs) to allow developers to develop application based on those building blocks and request data via usages defined in the consumption framework. The exposure of data associations from the semantic view layer into the design time allows the definition of navigation and data flow in a declarative manner. If an existing UX application is ported to a new design environment, the UX object composition can be directly re-used when defining a navigation behavior adequate to the new target device. For example, a master-detail relationship which is implemented as a navigation between two screens on a small form factor device, can be designed as a lead object and inspector side panel on one single screen on a desktop/laptop form factor device. The underlying UX object services and composition via ports remain constant.

In one embodiment, content changes are automatically propagated from the data layer to the presentation based on the change to the UX objects as reusable components for various views and various use contexts. For example, if a list view is changed, all presentations (e.g., UI patterns) using a standard view type will be changed corresponding to the updated version of the UX object (e.g., a list view will be updated to match a current list view type). Based on the concepts of automatic propagation of content changes and data streams for consumptions by a frontend, data content can be designed once and consumed on multiple clients. Content changes can be propagated for "usages" that are globally used. Local usage would not be affected by global content changes. The content change does not refer to a change of UX objects, but to the projections on semantic data objects. It will be understood that changes in UX objects (e.g., new capabilities) are automatically propagated for UX objects deployed as runtime components. Alternatively, an active client can interpret a specific version of a standard UX object, which may not include the automatic propagation.

Thus, instead of individually developing different channel-dependent user interfaces from basic UI concepts for the same data content as traditionally done, the use of UX objects with different views allows a system to generate and send "raw" business context data (i.e., not processed for any particular presentation type) to a client. The client can then be fully responsible for creating the user experience by filtering and processing views on the data based on client capabilities according to the UX object definitions. In such an approach, the model (M) aspect of a UI pattern or UI component generation architecture enables the pattern. The output is not a UI domain language, but a business or work domain language describing resources, views (through usages), and actions for a given business context or other context. A business context or other context refers to a context in which a data object or action are used or invoked. Client-side frontends consume data feeds that provide such raw business context data, and maximize the user experience on one device without being limited to cross-channel limitations. Unlike traditional business applications in which a UI pattern is fixed as part of a larger application, UX objects enable activity-centric applications such as mobile applications, desktop widgets, or transient tasks opened from message inboxes, etc., can be built based on a selected set of compound UI building blocks.

FIG. 1 is a block diagram of an embodiment of a system having a data use or data consumption framework. System 100 represents a data access system, such as an enterprise system of a business. Backend system 102 includes one or more backend servers 110, each with one or more data stores 112, 114. The data stores hold the actual data that is accessed and used for semantic objects. The data is accessible with SOA (service oriented architecture) framework 120, which includes various SOA interfaces 122, 124. Data from backend server 110 is accessed and manipulated via SOA framework 120, more particularly, through one or more SOA interfaces. The SOA interfaces are defined services that enable access to data for particular requests or with particular methods.

System 100 includes one or more servers 130 that connect with the backend system. In one embodiment, one server 130 enables object definition 104 for creating objects, and another server 130 enables data enriching 106 for enriching semantic objects with consumption information. Alternatively, both object definition and data enriching may be enabled by the same server, and may, for example, be used at different times for different purposes. Servers 130 provide the framework for data creation and enrichment for consumption definition.

As combined with semantic definitions, the services can be defined for specific contexts, such as specific business contexts. Object definition 104 includes data object 132, which has semantic definition 134, and context 136. Semantic definition 134 defines access to data through particular services for particular contexts defined by context 136. Rather than being a technical object with definitions of technical contents of the object, context 136 provides contextual contents, whose technical content is accessed through SOA interfaces 122-124. The use of those contexts is defined in semantic definition 134. Object definition 104 may be referred to as a platform adaptation layer, referring to adapting the platform-specific service interfaces to various semantic contexts.

Data enriching 106 includes data use framework 140, which may also be referred to as a data consumption framework or a consumption adaptation layer. Generally, framework enables defining how to use the data content of a data object. Thus, rather than simply allowing the adding or modifying of content of a data object, the data object can be enriched with definitions that define how the data is to be viewed and accessed. Framework 140 provides standards for data object access and relationships to enable access and viewing to particular objects in a standard way. Thus, the enriched data objects (e.g., service interface 142) at framework 140 can be instantiated with defined calls and methods in different user interfaces. The user interfaces, rather than needing to define the SOA interfaces or define access to the SOA interfaces, need only reference or interface with the enriched data objects to generate content in the user interface. Thus, an enriched data object can be considered from one perspective as a service interface. An enriched data object may also be referred to as a UX object.

Service interface 142 represents the enriched data object as a service interface or UX object. Service interface 142 may be considered an abstraction of the enriched data object. The enriched data object includes data object 132, which includes semantic definition 134, and context 136, and is further enriched by associating metadata definitions 144, templates/views 146, and methods 147. Metadata 144 includes definitions of how to access the methods and services of data object 132. Additionally, metadata 144 includes definitions of how data object 132 is associated with or related to other data objects. In one embodiment, related data objects may be accessed together, or one data object may reference another for a particular context. Metadata 144 can be seen as consumption rules or parameters that define how the data is to be accessed. An application or UI incorporating an object enriched with metadata 144 consumes the metadata as well as accessing the data, thus providing the data in the context of the metadata definitions.

Templates and views 146 represent additional definitions (which may be additional objects instances, or may be metadata definitions) that define how different displays on the data may be made (described in more detail with reference to FIG. 2). Thus, for example, in certain views, only parts of the content of data object 132 may be displayed. Different views may apply to the same object, depending on the use or context. Different views on the same object may display different content, which is all part of the same data object. Rendering of data in the user interface is at least partially based on the content to display for a particular view. Thus, the same user interface may include what appear to be different visualizations from a user's perspective, which in fact may simply be different views of the same data object, highlighting different content, showing different content, organizing content in different ways, etc.

Methods 147 define standard service interfaces of the enriched data object as a UX object. Thus, the enriched data object is service interface 142 because it has its own interfaces and methods that can be standardly interacted with by UIs. For example, methods 147 may include mechanisms to enable the processing of requests for certain content or services of data object 132. In one embodiment, methods 147 includes processing logic that may access data of data object 132, and then perform operations on that data for presentation to the requesting component of a UI. For example, certain content may be filtered or composed in a certain way (e.g., generating a list or organizing the content in a particular order).

In one embodiment, framework 140 includes UX object gallery 148, which is a gallery or data store of enriched data objects (UX objects or service interfaces). Gallery 148 enables rapid development of applications. Current application development is generally focused on developing a graphical or visual frontend, and then adding content to the visual components to provide functionality. Instead, gallery 148 includes reusable components that have defined content and defined views for various scenarios. Thus, development of a frontend (e.g., a user interface application) can focus simply on the functionality that should be included, and the visual aspects can be automatically generated based on the content and functionality definitions for an application. Additionally, rather than trying to generate a frontend by writing the interfaces to the services that access the data (e.g., trying to develop within the SOA framework itself from the frontend application), the frontend need only access objects from gallery 148 for particular functionality (often with a particular context defined), which objects then interface to the data itself and integrate the application with the SOA framework.

User device 150 is any of a number of devices, including desktop or laptop computers, netbooks, handhelds, so-called smartphones or functional mobile devices, etc. Each device has a native manner of data presentation in user interface 160, based on the hardware and software capabilities and configurations of user device 150. Additionally, within a particular device, different technologies may be applicable depending on the application or software used, which may have its own separate native capabilities. Decoder 152 interfaces access to reusable components of framework 140 (e.g., service interface 142, or other enriched data objects of gallery 148) with the native presentation of user device 150. Decoder 152 includes code definitions specific to user device 150 to enable native rendering on user device 150. Decoder 152 may also be referred to as an active client that receives, interprets and consumes data for a frontend device.

Decoder 152 also includes interface logic that enables access in standard ways to the enriched objects of framework 140. Based on the reusable components (e.g., service interface 142 or other components from gallery 148) of framework 140, user interface 160 can display dynamic views 162, which are generic to the underlying enriched data, and are specific to the user device. The dynamic views render according to the context and can change content viewed, views on content, and functionality based on content, all based on UI interaction with an end user and/or the change of a context within the UI.

Thus, a consistent user experience can be maintained with application build on top of framework 140, even across different devices, different connectivity capabilities, and different project scenarios.

It will be understood that each server and/or user device is a computing device, which is any device that includes processing hardware and memory suitable for performing the operations described with respect to each individual device. Typically the server(s) hosting the consumption framework have more powerful processing resources, and more memory resources, however, such a system configuration is not strictly necessary. There are many types of processors, microcontrollers, central processing units (CPUs), etc., whether single or multi-core, parallel and/or serial processing, general or specific purpose, etc. The processing resources perform operations on software/firmware instructions, such as instructions defining the framework, the objects, the definitions, etc. Memory resources could include volatile (e.g., any of a variety of types of random access memory (RAM)), and/or non-volatile memory or storage (e.g., Flash, hard disk). Memory resources store instructions for execution by the processing resources.

Figure 2:
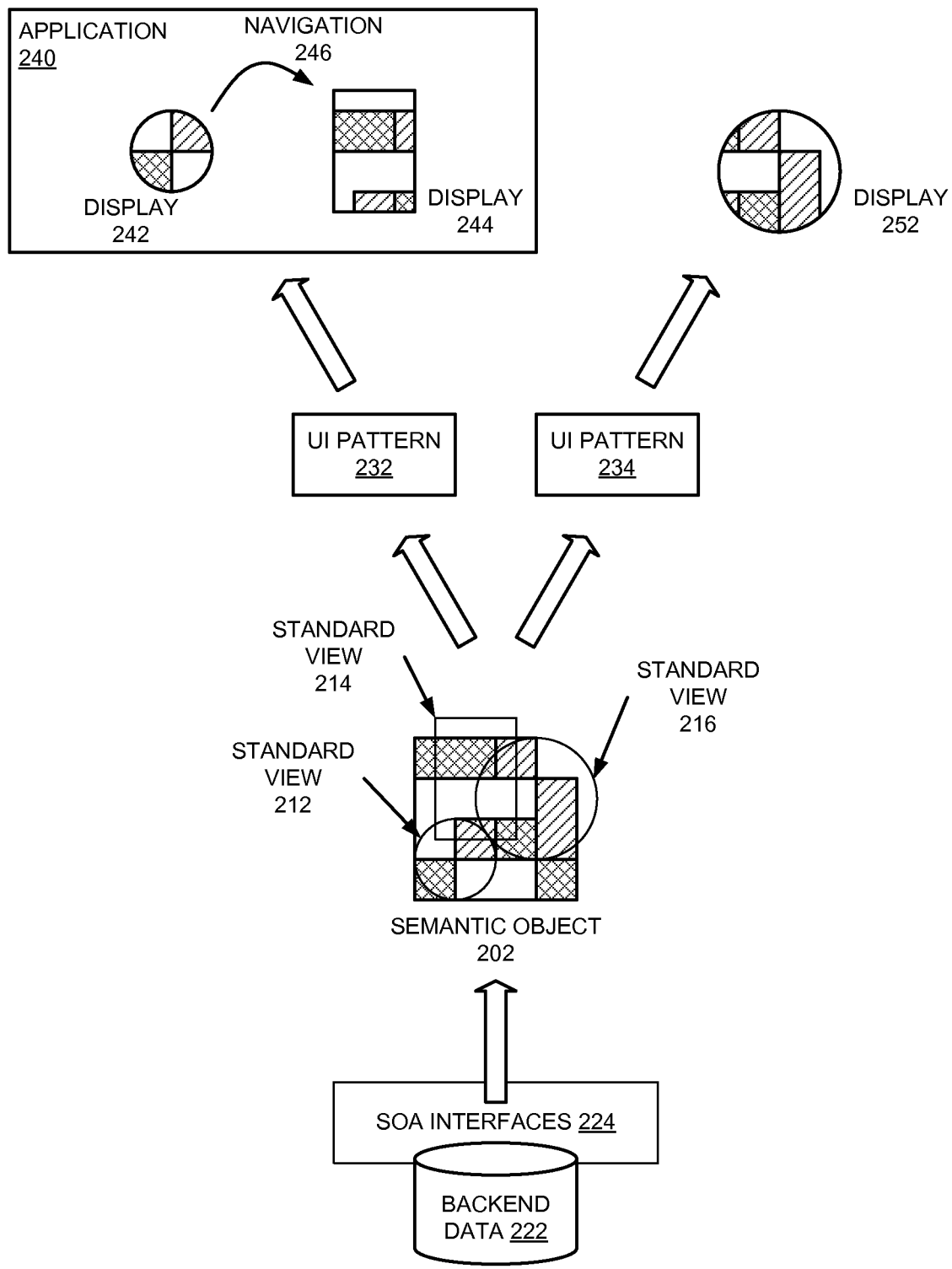
FIG. 2 is a block diagram of an embodiment of a semantic or user experience data object.

FIG. 2 is a block diagram of an embodiment of a semantic or user experience data object. Semantic object 202 is a data object that is enriched with definitions for use and access, as described herein, and is commonly used in an enterprise system. An enterprise system as referred to herein is an example of any type of system having "backend" data that is accessed by "frontend" applications. Frontend refers to systems and applications at the user end, or accessible locally to a user on a client device. Backend refers to systems and applications that are accessible remotely from the client device, and are typically accessed via one or more enterprise networks, which may include firewalls or other security mechanisms. Backend data is also referred to as enterprise-level data, which is available generally to users within the enterprise, based on privilege and security access, which is contrasted with local data stored on a user's client device. The backend data of semantic object 202 more particularly refers to data available through an SOA network or system.

Semantic object 202 is an example of a semantic object according to any embodiment described herein, and is generated from elements from one or multiple backend systems. Thus, object characteristics of semantic object 202 may be obtained from multiple sources. The different elements may be obtained through one or more services (e.g., web services) in the enterprise, as illustrated by SOA interfaces 224. For purposes of illustration, semantic object 202 is represented having various blocks put together to represent the object as a whole. Each block may represent a functionality, or an element of data, whether from the same or different backend systems. The figure is not necessarily representative of the number of characteristics of a semantic object in general. Semantic object 202 is enriched with associated standard view definitions 212-216. The standard views (which may also be referred to as usages) may be considered from one perspective as selective filters on content present in semantic object 202. The standard views define what object characteristics (e.g., attributes, actions, relations) are available for particular UI contexts and are used in UI building blocks. As graphically depicted in FIG. 2, each standard view 212-216 is represented as a shape that overlaps a portion of semantic object 202.

UI patterns 232-234 define UI contexts in which semantic object 202 may be accessed. As used herein, a UI context refers to a situation or scenario in which a semantic object may be accessed. For example, consider a situation that includes a business purpose or business situation in which the particular object will be used. For example, a Customer object may be serve different purposes when used in a Sales scenario that when used in a Product Support scenario. In one embodiment, a standard view specifically does not have any channel or device specific definitions. Thus, each UI pattern is generic across all channels and devices, and the client that accesses the semantic object is responsible for determining what is to be displayed and how (see FIG. 1 and accompanying description). In one embodiment, UI patterns 232 and 234 are templates for semantic object 202. Thus, semantic object may be instantiated and defined with a specific context for display per the definition of the pattern. Instantiation of the pattern or template can then provide a visualization of the data content in different applications. From one perspective, UI patterns 232 and 234 can be considered usages as UI building blocks that model UI behavior agnostic to presentation and navigation flow.

It will be understood that there is a relationship between standard views and UI patterns, but the two concepts are distinct, as displayed in FIG. 2. The standard view defines object characteristics that are applicable to a particular UI context. The views project a UX object as needed in a specific context of use. From the perspective of the UI pattern, a standard view may be considered an object characteristic. Multiple standard views may be applicable to a UI pattern. The standard view defines content specific to certain operations and contexts, and so enriches semantic object 202 with consumption information. A UI pattern may define several standard views for the UI context. Thus, a standard view type can be considered more generic than a UI pattern, with standard view types generic across multiple UI patterns, and UI patterns generic across multiple business scenarios.

In one example as illustrated, UI pattern 234 defines use of standard view 216, which can be incorporated as a UI component into a display. The resulting visualization may be display 252. UI pattern 232 is invoked by application 240 in the example of FIG. 2. Application 240 may use both standard view 212 and standard view 214 as different UI screens or as separate parts of the same UI screen. Standard views 212 and 214 may be different standard view types related to the UI pattern. The resulting visualization would be display 242, which may be related to display 244, and/or may provide navigation from one display to another. As used herein, the navigation 246 is a transition from one screen to another, which represents some action by the user (e.g., a mouse or pointer click/activation, pressing a key or button, inputting text, tapping a touchscreen, etc.). Thus, application 240 presents display 242, receives user input, and navigates to display 244. Application 240 is a composition of UI building blocks that operate on associations. In one embodiment, application 240 consumes metadata, and receives association metadata descriptions and executes on the definitions. Thus, application 240 and other applications can be generated from abstract navigation patterns that define relationships among data objects, actions, and services, which allows navigation of data without having to predefine (via coding) the navigation flow in the application. The development and operation of the application can thus be much more dynamic and responsive to user interaction, while allowing significant reuse of defined UI components and standard data interfaces.

In one embodiment, application 240 navigates based on object and view relationships. Such a navigation model of application 240 is contrasted with current approaches to applications, which code the navigation flow, or depend on hyperlinking. Current applications (even web browsers) have a specific set of functions or actions that can be performed, and are tied to the visual component to which the function or action is defined. Changing the data content in the application does not change the functionality or data access of the application in current applications. In contrast, the functionality of application 240 can be dynamic, because each display types 242-244 has associated content and functionality. Thus, the available actions and functionality of application 240 are dynamic with the navigation from one view to another. Rather than defining functionality of an application and feeding content to the application, application 240 can be defined as an application by the navigations, rather than available functionality. Application 240 becomes something of a meta-model of the navigation of content associated with semantic object 202 and its related objects.

Figure 3:
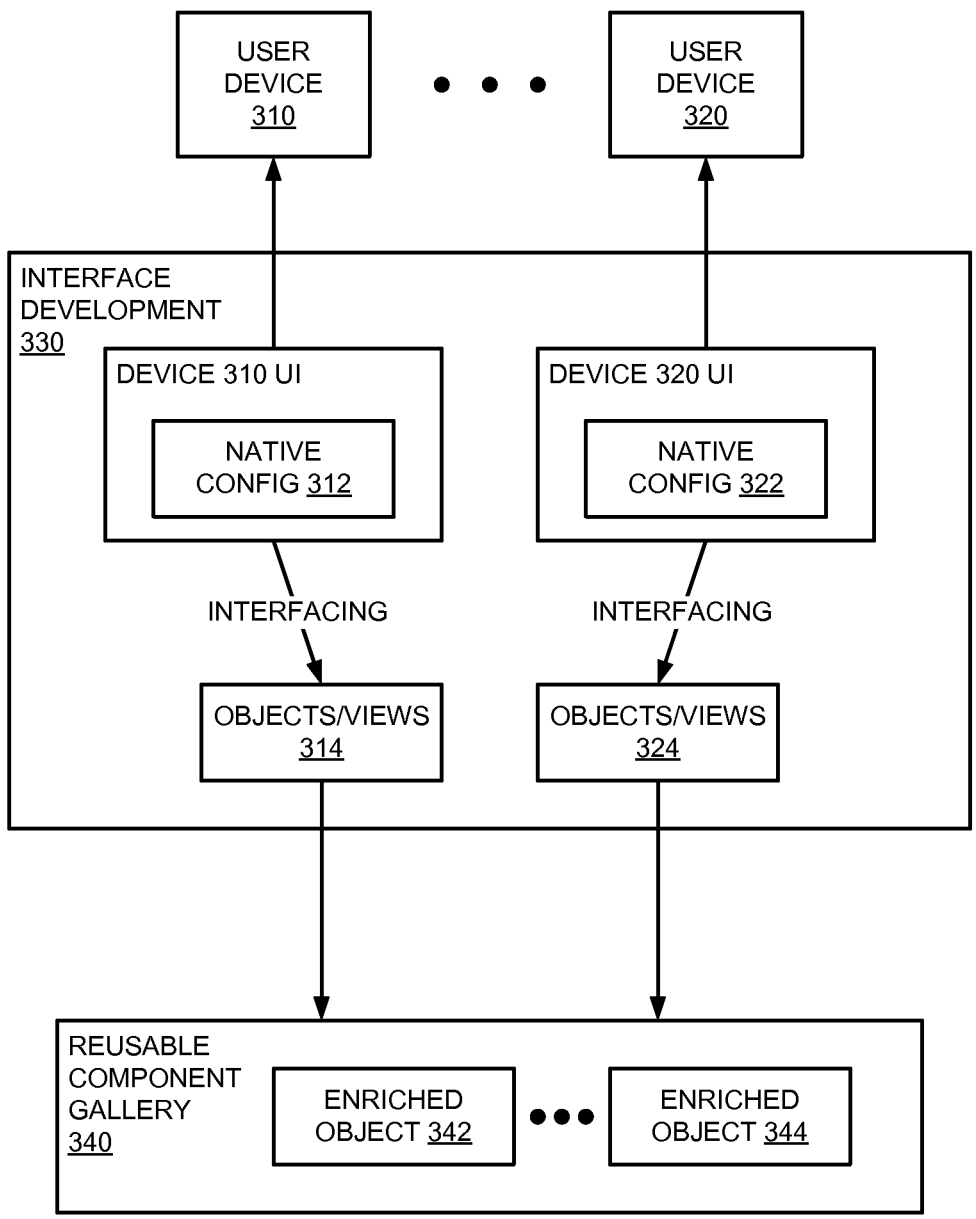
FIG. 3 is a block diagram of an embodiment of a system that enables user interface development from a gallery of reusable components.

FIG. 3 is a block diagram of an embodiment of a system that enables user interface development from a gallery of reusable components. System 300 represents an integrated development environment (IDE) that can generate user interfaces for different device types or devices having different configurations, illustrated by user devices 310-320.

Interface development environment 330 includes a development representation of a UI that is generated for different user devices 310-320. Essentially, the UI for each user device has a native aspect, and a common or reusable component aspect. It will be understood that where different devices are shown, the native rendering and navigation flows discussed could also be equally well applied to different technology on the same device. Device 310 UI includes native configuration 312, and objects/views 314. Object/views 314 represent enriched data objects as discussed above, with associated views. Device 320 UI includes native configuration 312, and objects/views 324. It will be understood that the different UIs could use different data objects. However, if the UIs for devices 310 and 320 are complementary UIs for the "same" application on different platforms (devices or device configurations), objects/views 314 and 324 would be the same. Native configuration 312 includes specific information for user device 310, which native configuration 322 includes specific information for user device 320.

Objects/views 314 and 324 represent objects accessed from reusable component gallery 340. Gallery 340 includes multiple enriched objects 342 through 344. The enriched objects are user experience objects or enriched objects according to any embodiment described herein, and provide access to backend data from an SOA network.

It will be understood that in the case of developing a UI for the "same" application for multiple user devices 310-320, and/or multiple channels (connection types) of user devices, common objects and views are interfaced and used in the development of the applications. Thus, there would not need to be development with respect to the various objects and views across the different devices or channels. Instead, development effort can be focused on interfacing the common objects and views with corresponding enriched objects 342-344 of gallery 340. It will be understood that multiple views may apply to a given object for a given application.

Figure 4:
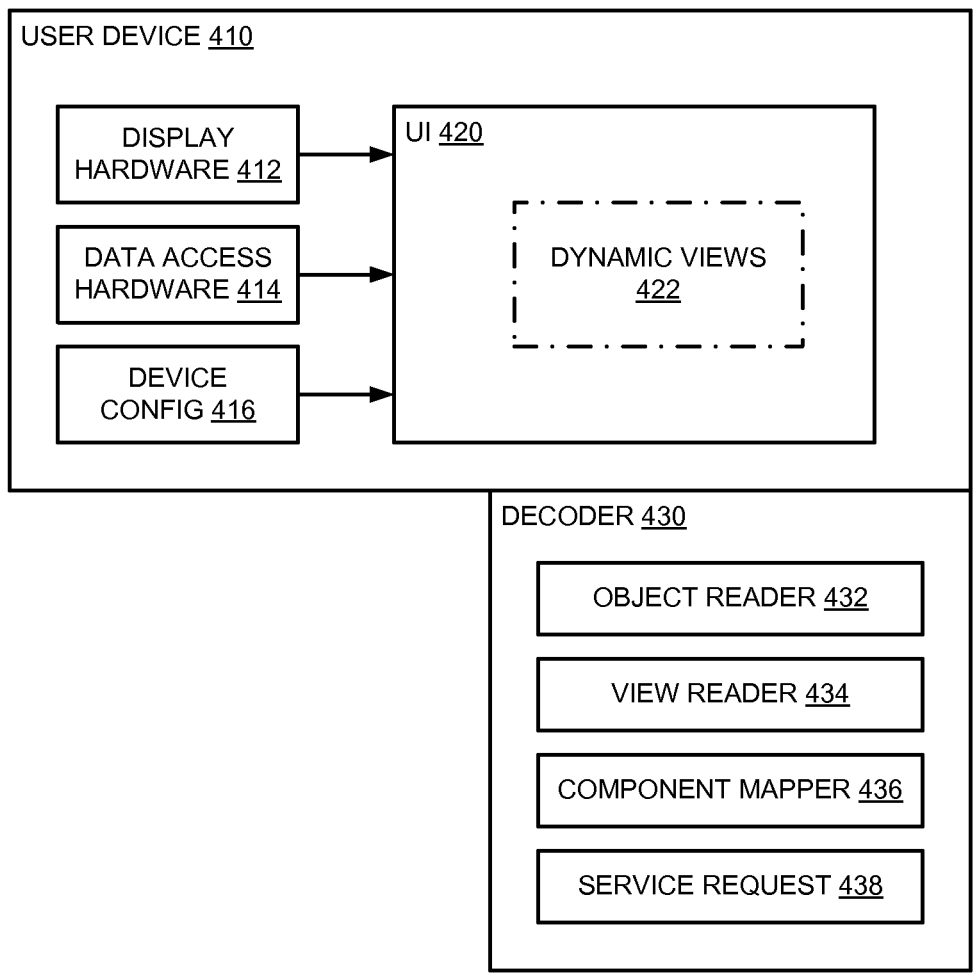
FIG. 4 is a block diagram of an embodiment of a user device having a decoder to implement dynamic UI views based on reusable components.

FIG. 4 is a block diagram of an embodiment of a user device having a decoder to implement dynamic UI views based on reusable components. User device 410 has display hardware 412, data access hardware 414, and device configuration 416. Display hardware 412 may be different from device to device. For example, some devices have touch-screen displays, where others have LCD (liquid crystal display), or other display technology. The interfacing on a device with a touchscreen may be through the touchscreen and/or a scroll wheel, for example, whereas the interfacing may be primarily mouse or pointer-device driven for an LCD screen.

Data access hardware 414 generically represents hardware resources that affect how user device 410 is able to access, store, and render data on data hardware 412. For example, network connections (e.g., wired Ethernet, wireless broadband, cellular/data network, etc.), storage capacity, memory, processor throughput capacity, dedicated graphics processors, etc. Data access hardware 414 may affect how much data can be stored and rendered at a time, and in what form it may be displayed.

Device configuration 416 indicates any other configuration, whether software or hardware, not covered by display hardware 412 and data access hardware 414. For example, drivers and software engines (e.g., a Flash viewer) can affect what user device 410 can display on UI 420. Certain features that exist in hardware may be disabled by configuration, either temporarily (e.g., low power mode for power conservation, airplane mode), or as part of a device configuration (e.g., service not purchased).

UI 420 represents the user interface displayed on user device 410 to an end user, which views the data and interfaces with the data via hardware and software mechanisms. Dynamic views 422 are possible through the enriched data consumption framework described herein. Dynamic views 422 represent the fact that rather than a fixed GUI (graphical user interface) to which functionality may be attached, the display of data is driven by the functionality and views chosen for the application. Thus, the "application" does not have a fixed "face" as is commonly thought of based on current application development, but the application visualization and functionality can change based on the data accessed, and its associated views.

Decoder 430 represents one or more components that interface the enriched data content with UI 420. More specifically, decoder 430 either reads device configuration 416, or is configured or programmed based on device configuration 416 to essentially translate the content of the enriched data consumption framework to dynamic views 422. Decoder 430 may include object reader 432, which accesses the enriched data object from the framework. Object reader 432 enables decoder 430 to interface with the data objects. Such interfacing may be performed through standardized or defined access methods, calls, templates, or service requests. In one embodiment, the enriched data consumption framework has an associated set of access definitions, which may be defined based on functionality desired in the application. View reader 434 represents components that enable decoder 430 to read device configuration 416, as discussed above, to have information about how to render object content for the particular user device 410.

Component mapper 436 represents modules that enable decoder to map interfacing mechanisms (e.g., the calls, templates, etc.) with device-specific capabilities. For example, consider a device that allows selection of objects via either depressing a particular button, or by tapping on the screen. In such an example, component mapper 436 may recognize both native capabilities of user device 410 to map to a particular method call on an enriched data object, and maps both actions to the method. The particular selection may bring up a different view on data, which is rendered in the interface in response to the action. The interfacing in a different device may cause its decoder to map a different action to the method call, and map the different view to its native user interface. Thus, the development of the application for accessing and viewing data can be further abstracted to the functionality level, which is the same across devices, without having to configure particular service interfaces for the backend data access.

Service request 438 represents logic to process requests in the UI and map requests to the UI components. A request in the UI refers to something happening in the UI that the application can perceive as a user interaction, and specifically user input. Such interactions may include keystrokes, mouse or pointer movements, touches or taps on the screen, rotation or movement of the device, etc. Service request 438 may particularly match user interactions to UX objects, allowing the interface to access backend data through the interfaces defined within the UX objects. In one embodiment, service request 438 and component mapper 436 are the same component or related as subcomponents, or alternatively may be separate components or subcomponents that function together. UI components based on enriched objects may have their own service calls, which are accessed by service request 438 of decoder 430, which can be coded specifically for the technology of user device 410 and make requests of the UI components through service request 438.

Figure 5A:
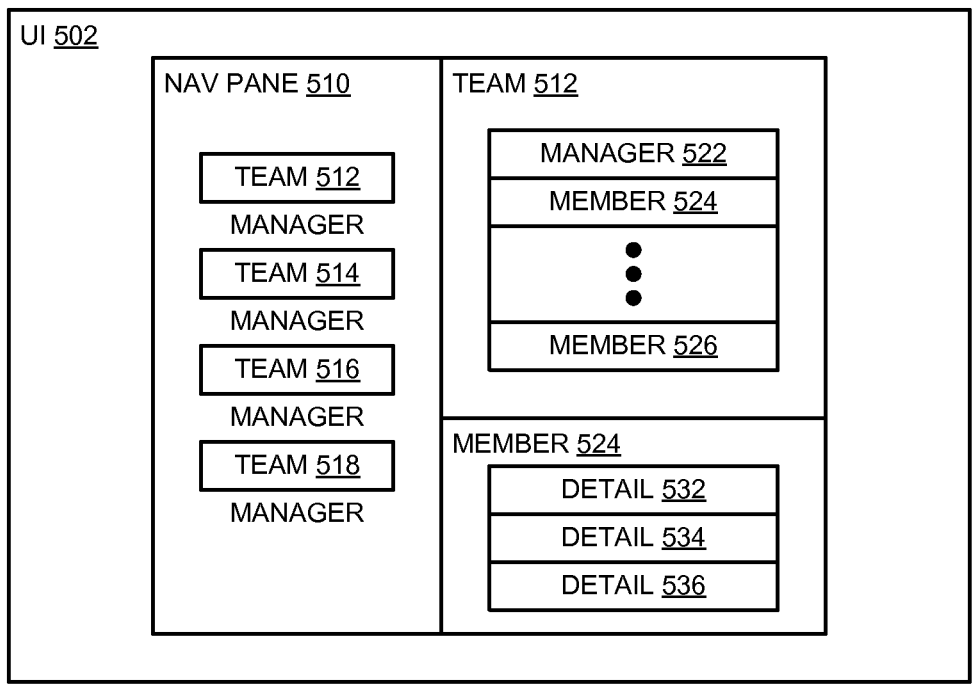
FIGS. 5A-5C illustrate different native UI rendering of common reusable data components.
Figure 5B:
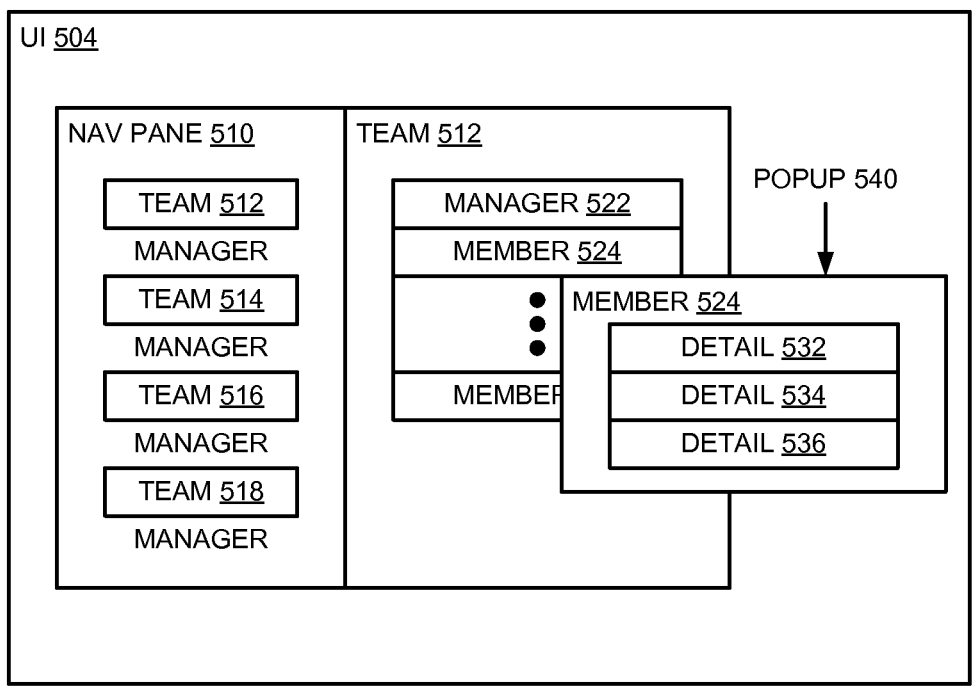
Figure 5C:
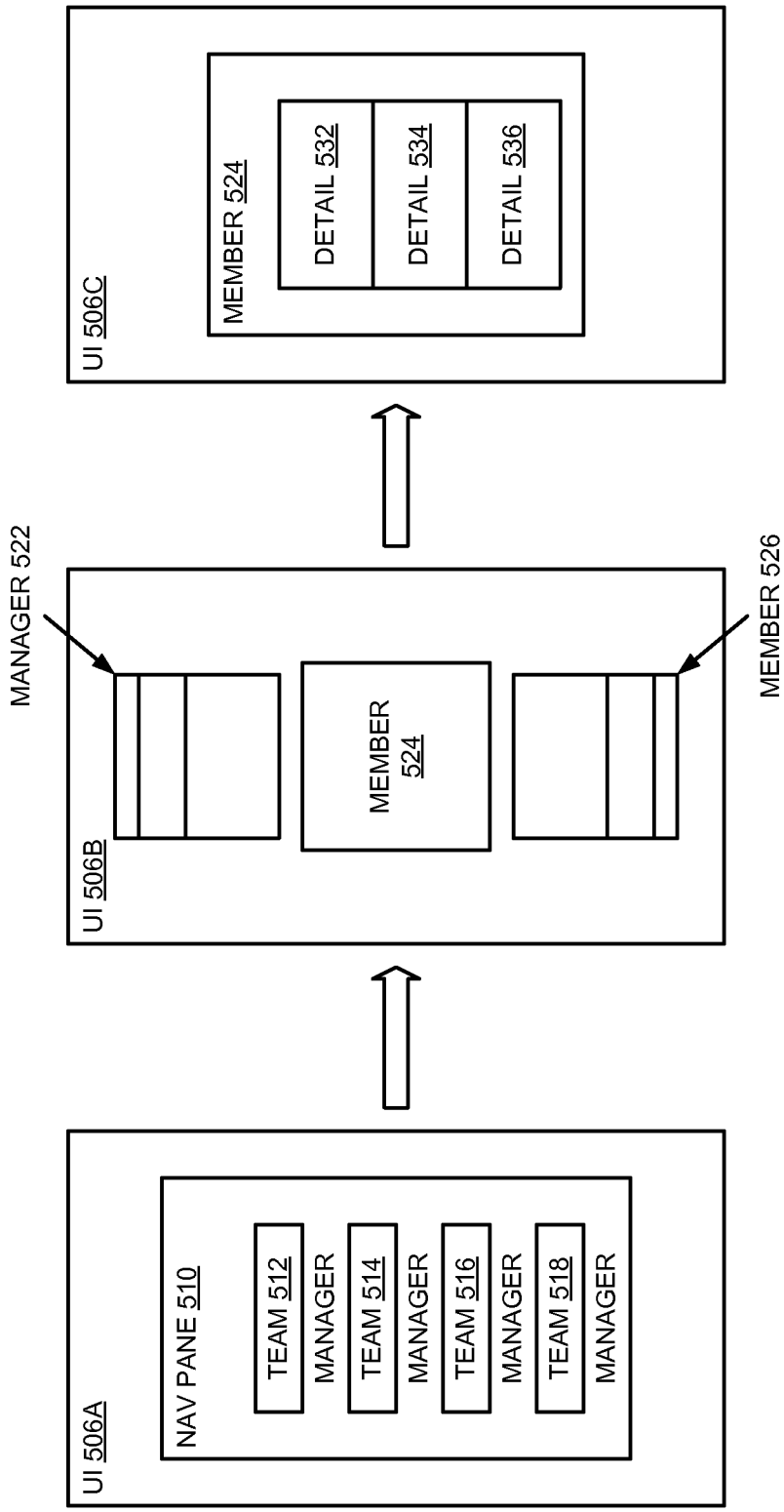

FIGS. 5A-5C illustrate different native UI rendering of common reusable data components. Assume for purposes of the examples in UI 502 of FIG. 5A, UI 504 of FIG. 5B, and UI 506 of FIG. 5C that a Team object exists, which includes or is associated with a Manager object, and multiple Member objects (of which Manager may be a part). Each Member and Manager object includes, or is associated with a particular BusinessCard object for an associated Member or Manager. Thus, for each Team object, there is a possibility of accessing Manager, Members, and BusinessCards for the Members. However, further assume that Team objects are implemented as semantic objects, enriched with definitions, including views. Among possible views of the Team objects are a short-list view or usage that indicates a view of a Team object to use when a high-level summary of the Team is to be displayed, a line-item view or usage that indicates details of the Team's composition, and a BusinessCard view or usage that indicates details of a given Member.

UI 502 of FIG. 5A represents the user interface of a particular device in a particular configuration. UI 502 includes navigation (nav) pane 510, from which an end user can navigate through the data that is displayed in the particular application displayed in UI 502. Navigation pane 510 may be associated with a short-list view, and thus display Teams 512, 514, 516, and 518 with their corresponding Managers in short list view. The content shown in the UI is defined for the particular view. Team 512 illustrates a focus pane within UI 510 that shows details of the Team as defined by the view type represented in that pane. It will be understood that the data content for Team 512 and its Manager as displayed in navigation pane 510 is the same data as displayed in the focus pane of Team 512, but showing different views (short-list view versus line-item view).

UI 502 also illustrates an additional focus pane, Member 524, which can show particular details related to a single Member selected from Team 512. In the example, Member 524 of Team 512 is selected and shown with details 532-536. The focus pane may be a business card view of Member 524. As with the content shown in the pane of Team 512, the data content for Member 524 as displayed in the pane for Team 512, and as highlighted in pane Member 524 is the same content showing different views (e.g., business card view versus line-item view). It will be understood that navigation pane 510, Team 512, and Member 524 may be the default or native manners for showing data content, respectively, in short-list, line-item, and business card views. It will also be understood that while three panes are shown with three different view types, there is not a theoretical limit on the number of display areas or panes, nor on the number of types of views. Additionally, additional and/or different view types can be used, and the illustration of short-list, line-item, and business card should not be considered limiting. Such considerations are left to the implementation of each device and system.

UI 504 of FIG. 5B represents the user interface of another device in a particular configuration, or the same device as UI 502 in a different configuration. UI 504 includes navigation pane 510, from which an end user can navigate through the data that is displayed in the particular application displayed in UI 504. Considering the same example as FIG. 5A, three views, short-list view, line-item view, and business card view, are illustrated and associated with three different viewing areas (navigation pane 510, Team 512, and Member 524, respectively). Assume that UI 504 represents a view of the data content in a browser, whereas UI 502 represents a view of the data in a business application.

Navigation pane 510 of UI 504 may appear identical to the navigation pane in UI 502, with the same information displayed in the same visual or graphical layout. The underlying mechanism for generating or rendering the two panes may be different. For example, the data content may be decoded in UI 502 and rendered via a business application platform that enables viewing the data. With UI 504, the content may be decoded differently for native rendering by the browser engine. Again, Team 512 is displayed, as is the detail pane for Member 524. However, the detail for Member 524 is generated and rendered in popup 540 in UI 504. Clicking (e.g., with a mouse or pointer) on Member 524 may cause popup 540 to be generated. Alternatively, popup 540 may be rendered in response to a "mouse-over," where the pointer is moved to be located over the text and/or graphic representing the Member object for at least a certain period of time. From the illustration, it may be understood that native rendering in the configuration of a device displaying UI 504 is for Member 524 to be displayed popup 540, instead of using a separate section or pane of the display.

FIG. 5C is illustrated with UI 506 separated into three different displays, UI 506A, UI 506B, and UI 506C, representing different views that would be seen from navigating through the content. The associated device of UI 506 may be a mobile handheld device. Such handheld devices frequently have a touchscreen display, but have a display that is typically smaller than the display device used on laptops or other computer systems. Thus, the content may be viewed in portions (UI 506A, UI 506B, and UI 506C). While it is common for handheld devices to navigate through content, and display content one screen at a time, there is a distinction with what is illustrated in FIG. 5C. Known navigation involves coded programs that include code definitions for buttons or icons on the screen that then navigate to different content by virtue of loading the different content. In contrast, or in addition to such functionality and navigation, UI 506 navigates from one screen to another via associations and views on the same content. Thus, as with the different display panes of UIs 502 and 504 discussed above, UI 506A, 506B, and 506C show the same content, but different views of the content.

Thus, for example, UI 506A may illustrate navigation pane 510 with short-list views. UI 506B may be displayed to show the Team with a line-item view in a list or scrollable group (e.g., a COVER FLOW of Apple Inc. of Cupertino, Calif., or a 3D WALL as available from Cooliris Inc. of Palo Alto, Calif.). All copyrights used herein are the property of their respective owners, and are used herein solely for purposes of identification. Thus, Manager 522, Member 524, and other members may be shown as icons or graphics that can be scrolled through to select the item of interest. In one embodiment, the view can change based on rotation of the device, and based on native rendering options available on the device. UI 506C illustrates a business card view with Member details.

Each of the different views is shown by selecting an interactive element of the display, which changes the rendered display to a different view of the same content. The different views on the data may be generated from one view to another based on relationships between the data, for example, a master-detail relationship between panes or views 510 and 512, and 512 and 524. The displays are rendered from the same content for each device or configuration, but rendered in accordance with the native capabilities of the device or configuration on which the display is generated.

The ability to switch between different views enables a consistent user experience of data across different technologies and different devices. Thus, an application can be generated and ported from one technology to another, such as a WebDynpro platform available from SAP AG of Walldorf, Germany, and Silverlight of Microsoft Corporation of Redmond, Wash. Thus, different user interface technology can be used to connect to the same data and provide a consistent UI experience. An application can also be generated and ported from one structurally different device to another, such as a computer or laptop to a mobile device, for example. Access to views and functionality on data can also be generated and ported from one container to another within a device.

Figure 6:
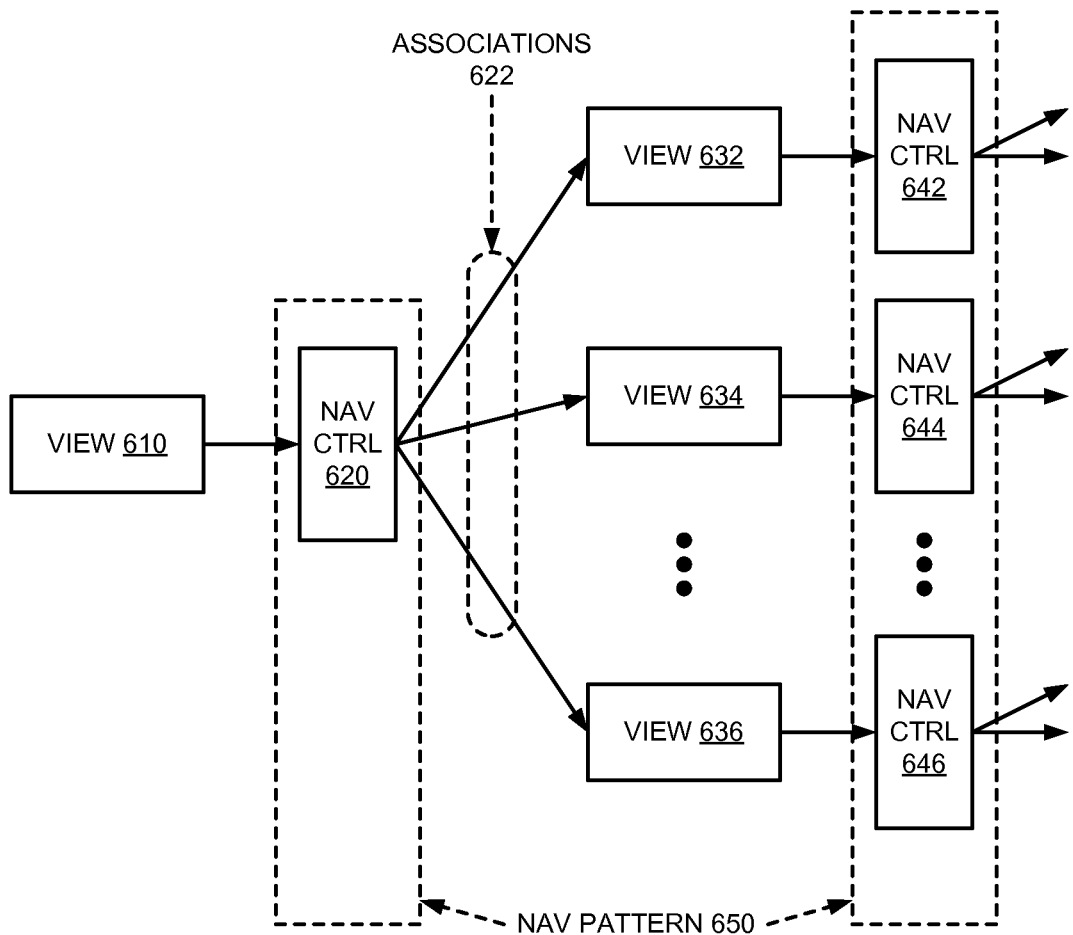
FIG. 6 is a block diagram of an embodiment of application interfacing via navigation patterns.

FIG. 6 is a block diagram of an embodiment of application interfacing via navigation patterns. System 600 illustrates an example of a user interface system or an application. View 610 is a particular UI display on data. View 610 is rendered from UI components that define consumption of data, and have methods or calls to access standardized enriched elements. In accordance with what is described above, view 610 is a view on underlying data, where the view defines interaction with a service interface that enables access to the underlying data. Rather than controlling operation of an application with coded instructions, as is presently performed with business applications, system 600 controls UI changes with navigation pattern 650. Navigation pattern 650 defines the changing of views on the data. Navigation pattern 650 includes one or more abstract patterns, which are not defined for a particular device or UI technology, but are generic to device and technology. The generic definitions allow the same data to be consumed and rendered natively on different devices and/or technologies.

The UI is dynamically rendered based on the view on the data. It will be understood that this is also contrasted with current browser technology that navigates through different data based on links, rather than different views on the same and different data based on associations. The control for traditional browsers is to select a link that brings up different data. Instead, system 600 uses relationships that are defined in enriched data, and/or relationships that are part of the underlying data objects, and defines changes in views of the data based on the relationships. Thus, from one perspective, navigation pattern 650 is a set of rules or definitions of how data views are related and how changes from one view to another take place.

Navigation pattern 650 is illustrated with navigation control 620, as well as navigation controls 642, 644, . . . , and 646, which are abstractions to represent logic in the UX objects and/or UI components generated from UX objects. For each view (610, 632, 634, . . . , 636), there is a corresponding control that defines navigation from the view to another view based on associations 622 of the view, or triggered or selected by user input and/or context within the UI. It will be understood that although each view illustrated in system 600 is represented by its own reference number, one or more of the views may be the same view—thus, the same view may be navigated to via different paths from different starting views. Thus, system 600 built as an application represents a complete shift from the manner in which application development and UI interaction currently happens. The application development can consist in enriching and defining relationships among data objects, as well as defining the navigation between views on those data objects. The application is automatically rendered based on the views, relationships, and navigation patterns between them, rather than hard coding the application flows. The UI interaction, rather than relying on fixed, coded reactions, the UI flow is dynamically generated based on the views of the data selected, including based on the relationships between the data elements.

Figure 7A:
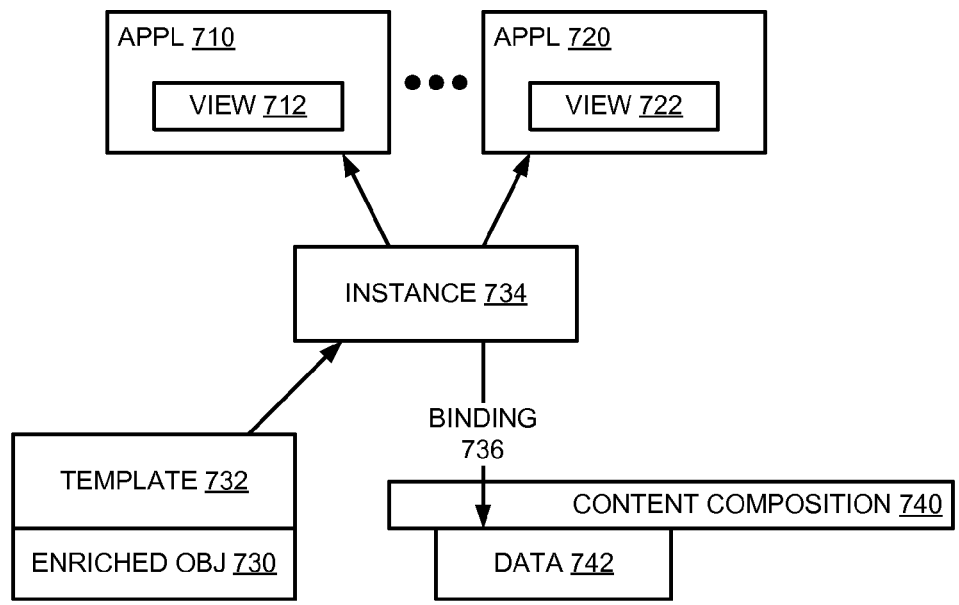
FIG. 7A is a block diagram of an embodiment of rendering a view of enriched data objects in an application based on templates.

FIG. 7A is a block diagram of an embodiment of rendering a view of enriched data objects in an application based on templates. System 702 illustrates rendering of a display of data 742 in one or more applications 710-720. Each application has an associated view 712-722, respectively, which represents a view on data 742. For purposes of discussion here, it is useful to recognize that each of views 712-722 can be the same view on the same data, as adjusted for UI or software/driver display technology, and/or differences in hardware devices for presenting the display.

Each application renders the data content in the particular view (712-722) based on access to instance 734, which represents an instance of a standardized, enriched data object 730. The instance is standardized because it is based on template 732. Template 732 illustrates one embodiment of enriched data object 730, which is based on the underlying semantic data object(s) that define access to certain SOA interfaces, and is enriched with additional definitions of relationships and possibly navigation patterns, as well as standardized views of data. The views are standardized in being defined to provide consistent views across different data objects, as written into different templates and as associated with the different data objects. Thus, standardized views rely on common features, interfaces, methods, etc., of the data objects to provide the view. The same interfacing mechanisms and methods can be employed across all standardized views.

Instance 734 is a runtime instance of an enriched data object represented by template 732. Instance 734 is bound to the backend data at the time of instantiation, or within a period of time after instantiation. Binding 736 represents the runtime connection between the instance of the backend data 742, as accessible via the content composition layer 740. Content composition layer 740 is an example of a data consumption layer as described herein. Content composition layer 740 provides a framework in which data 742 may be enriched into template 732, which is then instantiated and bound to the backend data. Each application 710-720 that provides a view on the data incorporates instance 734 as bound to the backend.

Figure 7B:
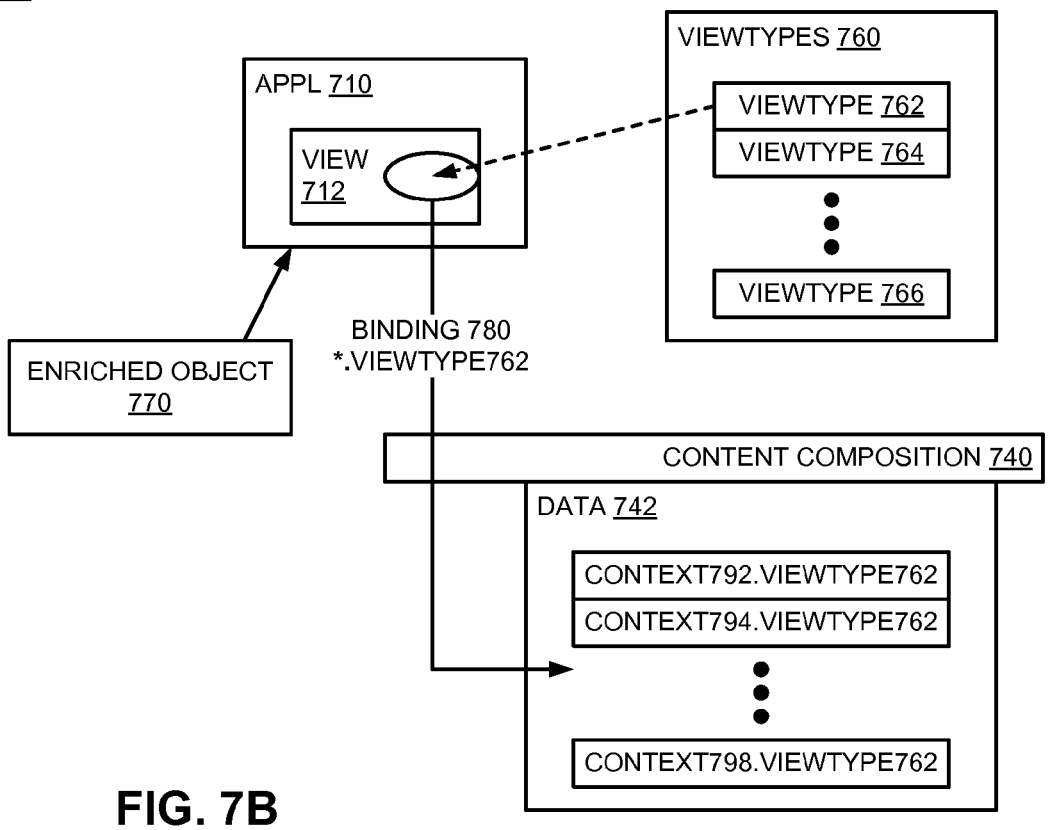
FIG. 7B is a block diagram of an embodiment of rendering a view of enriched data objects in an application with runtime binding.

FIG. 7B is a block diagram of an embodiment of rendering a view of enriched data objects in an application with runtime binding. System 704 illustrates a rendering of data 742 in view 712 of application 710. System 704 enables a late binding of the data with the backend. The late binding may be referred to as a runtime binding or user-directed binding. Application 710 renders view 712 from enriched object 770, which includes definitions, associations, and views along with the data content. Enriched object 770 is incorporated into application 710 prior to being uniquely bound to the backend elements, and its components are not necessarily directed to a particular SOA interface or particular data. Thus, the service interface definitions and descriptions may not be completely defined. The completion of the service interfaces occurs during the runtime of application 710, which allows for a dynamic interactive experience with the data content.

For example, consider viewtypes 760, having multiple potential types of view, viewtypes 762-766. It will be understood that "viewtypes" is a label to designate a type or scenario of a view. For example, the types of views may include, but are not limited to, list views, icon views, graphic views, line item views, group views, graphical views, etc. Other labels could be used. Other views could be defined and used. The viewtypes may be referred to as usages in certain scenarios, referring to the manner in which data may be used in a business context. The viewtype is selected and added to application 710 to provide view 712. However, the context of the viewtype is not designated until runtime. Thus, the actual binding to the backend cannot be accomplished until the context is determined and defined for application 710. The enriched object expects a certain generic behavior, or has standardized interfaces. Thus, accessing the enriched object is performed by providing expected calls, request, or behavior. Certain context information can be passed at runtime to the enriched object to invoke the behavior of the enriched object in the context of the passed information.

Binding 780 illustrates a binding definition of "*.viewtype762," where '*' represents the context that is not defined prior to runtime. The context may also be dynamically changed for the application for particular data objects, which would dynamically alter the rendering (and thus the visual/graphical layout, and potentially its functionality) of the application. Without a specific definition of the context, the application only knows that a view of a particular type is requested. The binding is completed by providing the context, for example, by a call by a particular visual component already in application 710, by a command from a user interaction, by a related object or component, by metadata associated with an application or application scenario, or by deduction (e.g., a heuristic algorithm or a lookup table) that determines a context based on factors present in the application (e.g., what other types of views are presented, an action associated with a selectable component of application 710, etc.).

Thus, binding 780 binds the component at runtime to data 742 with a particular context.viewtype, for example. As illustrated, data 742 includes context792.viewtype762, context794.viewtype762, . . . , context798.viewtype762. Context 792 . . . context 798 may be selected contexts, such as, for example, default, sales, applications, screen type, etc. Any of a variety of contexts may be defined and configured for the system. With the binding, the particular view rendered in application 710 is based dynamically on what occurs within application 710, as is described in more detail below with respect to FIG. 9.

Figure 8:
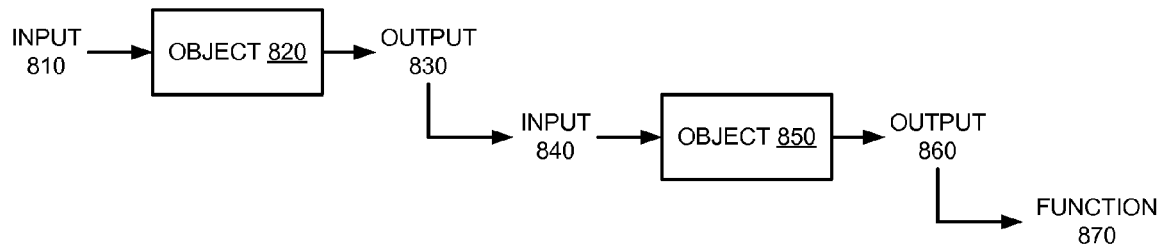
FIG. 8 is a block diagram of an embodiment of data associations.

FIG. 8 is a block diagram of an embodiment of data associations. Metadata definitions that enrich a semantic data object can define associations of the semantic data object with other data objects (semantic data objects, and/or other data objects). Data associations can provide additional functionality and/or show other data related to the data content of the semantic data object. In one embodiment, the associated objects provide a service on a data element of the semantic data object to produce an output. The associations of data objects may be chained, and they may also or alternatively exist in parallel with each other.

Input 810 represents an input parameter, such as a user interface interaction, or the input of certain data values. Input 810 is received at object 820, which may access certain services, and execute defined functionality in response to receiving the input. Object 820 generates output 830 from input 810 and its defined operations. Output 830 may then become an input, input 840, for another object (object 850). Object 850 then performs its own operations on the output of object 820 to generate output 860, which may cause function 870 to be performed, or may provide function 870.

Figure 9:
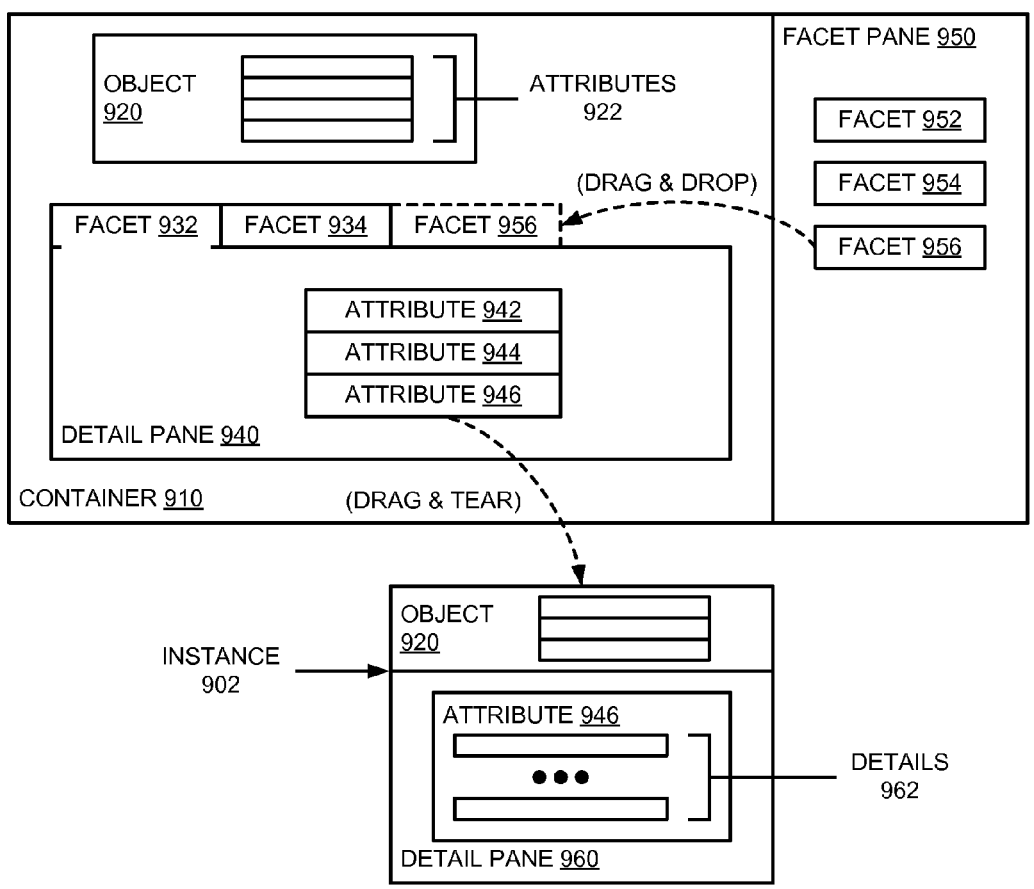
FIG. 9 is a block diagram of an embodiment of runtime guided interface rendering based on enriched data content.

FIG. 9 is a block diagram of an embodiment of runtime guided interface rendering based on enriched data content. System 900 represents a user device that accesses a data access system with a consumption framework according to any embodiment described herein. Container 910 represents an application or a container of data objects with associated navigation information. Container 910 presents a UI to an end user of device 900, which includes an interactive and dynamic display. The interaction with container 910 as described below is in contrast with current technology implementations where data is bound at a UI screen level, where each screen of a UI is coded, and data is bound to the elements of the screen. In such an approach, a screen instance must be developed for each scenario intended to be handled by the application, for example, of a business application.

In contrast, container 910 allows late or runtime binding of data, allowing interactive screens that do not need to be and are not defined and fixed. Rather, elements are included and dynamically changeable. Consider that for a particular function or operation of an application, object 920 is displayed. In current known technology, object 920 would be made part of a screen to allow the functionality desired. Instead, object 920 is instantiated in interactive container 910. Assume that object 920 normally displays with attributes 922 when displayed for the particular function desired.

In one embodiment, object 920 has multiple facets, which refer to contexts and associations in which the object may be used. For example, facets may be a use in a sales system, use in a customer role of a customer relations management (CRM) system, as a business partner, etc. Each different use context or usage may represent a different facet as coupled with associations with different objects or data applicable to the context. There may be active and inactive facets associated with a particular object for a particular UI. For example, a particular employee may not need particular data with respect to one facet, and so container 910 as an application for that employee may contain facets 932 and 934, but not facet 952. The data shown in detail pane 940 may be dynamic based on the facet selected, showing different views on data based on the context of the facet and requests made within container 910 and detail pane 940 by the user. As illustrated, facet 932 may show attributes 942, 944, and 946 of object 920 or associated objects when facet 932 is selected. For example, all orders (attributes 942, 944, 946) of a customer (object 920) may be shown for a particular facet 932 (e.g., a particular CRM scenario and function). The data displayed is dynamic based on interaction in container 910, with the data bound to the backend (not shown) at runtime.

The runtime binding enables dynamic runtime changes of the UI. For example, in one embodiment, facet pane 950 may be available as an option, or as an always-shown UI component that illustrates unselected or inactive facets 952, 954, and 956. In one embodiment, an end user may consider that it would be beneficial to have facet 956 as another selection for detail pane 940 within container 910. Thus, the user may select facet 956 and add the facet dynamically to the "executing application." The change or addition of the UI "application" represented by container 910 does not need to be performed at design-time by a developer, who would then recompile the program and execute it. Rather, the change can be performed by the user at runtime, and the elements of the activated facet would be bound. An example of adding facet 956 may include the user dragging and dropping facet 956 from facet pane 950 (where it may be shown in list view, for example) into detail pane 940. The dragging and dropping alone could cause facet 956 to be displayed with any number of details (as defined by an appropriate view associated with object 920 and/or an associated object.

In addition to adding functionality to a container, the interactive container could be used to spawn a new container. For example, if the end user determines that attribute 946 is significant in and of itself, and would be useful as an application or standalone element. For example, consider that facet 932 illustrates a list view of products, as detailed by attributes 942, 944, and 946. The single product 946 could be "torn off" of container 910 and dropped on a desktop environment of a UI of system 910. Instance 902 could be a new instance. In the new container, object 920 may again show attributes 922, or a different group of attributes may be shown. Additionally, attribute 946 includes certain details 962, which are displayed in detail pane 960 of instance 902. It will be understood that details 962 are dynamically rendered, and the new container displayed and its elements bound to the backend in runtime. Attribute 946 may or may not remain in detail pane 940 as it was prior to the spawning of the new container.

Figure 10:
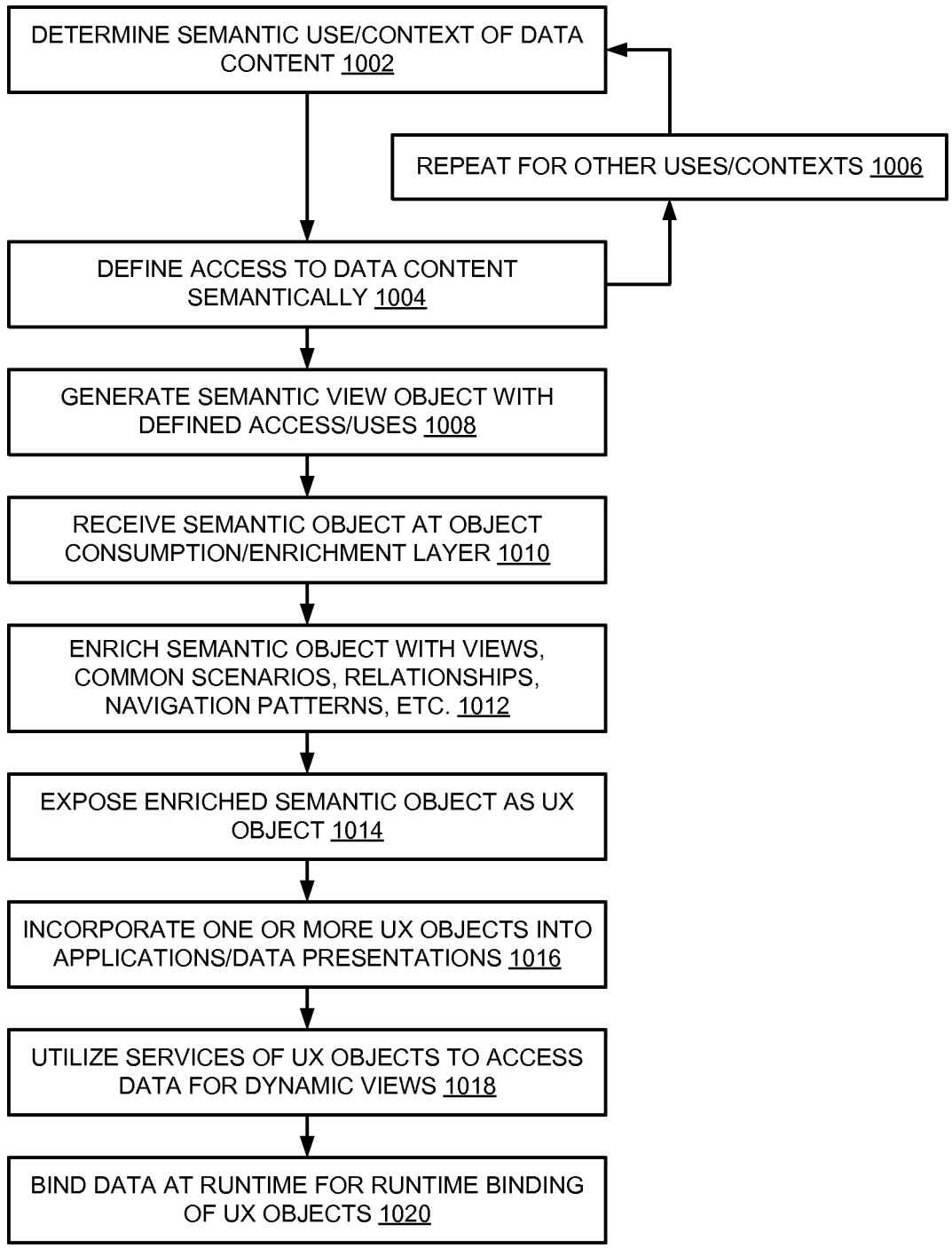
FIG. 10 represents a flow diagram of an embodiment of data access and presentation through a semantic object framework.

FIG. 10 represents a flow diagram of an embodiment of data access and presentation through a semantic object framework. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

In development of a system, a developer determines the semantic use or context of data content, 1002. The data content includes the technical definitions and characteristics of data objects as accessed via an SOA. The semantic use of the data content refers to how the technical content is to be accessed and used in a real system. The semantic use may be incorporate and reflect the knowledge of experts familiar with systems and processes. Access to the data content is defined semantically, 1004, having contexts and scenarios in which the various aspects of the content may be applied in particular ways. The identification of semantic uses and definition of access based on the semantic uses is repeated for other uses or contexts, 1006.

When the semantic uses are defined, the data definition framework can be employed to generate a semantic view object with access as defined for one or more uses, 1008. A data consumption or data enrichment framework layer receives the semantic object having its content and data access definitions, 1010. At the framework, the semantic object is enriched with views, common scenarios, relationships, navigation patterns, and/or other information describing the consumption or use of the object. In particular, ways in which the data content is viewed (presented) and accessed and interacted with in a UI are defined. The definitions are associated with the semantic objects to generate an enriched object.

The framework exposes the enriched semantic object as a UX object, 1014, which has the data content, with access (including views and interactions) defined, as well as methods and actions associated with the UX object. UX objects may be of particular types that each has different methods and capabilities. The UX objects themselves can be used as UI components. Multiple UX objects may be combined into a UI component. The UI components are used to build applications or functional user interfaces. The framework may expose the UX objects and enable interfacing through standard calls, methods, or procedures.

The UX objects are incorporated into applications or containers or data presentations, 1016, providing access to the data content in the views and associated with functionality (actions) and other data. The application utilizes the services of the UX objects to access the technical content for dynamic views within the UI, 1018. In one embodiment, the data is bound at runtime for runtime binding of UX objects, which enables dynamic runtime changes of a UI, 1020.

Certain details with references to the drawings are described above. It will be understood that the descriptions of embodiment of the invention are examples, and do not limit implementations of the teachings herein. Addition examples follow, which may be illustrative with certain examples, and should also not be construed as limiting. While certain "pseudo-code" follows, it will be understood that any appropriate language may be used to implement the invention. The enriched semantic objects may be enriched with various definitions that can define ports or communication links with the objects, dependencies and associations, facets, and actions. Examples of each are provided below. These elements are not meant to be exhaustive or limiting on how a semantic object may be enriched.

In one embodiment a port is an event-driven data exchange between UX objects. A port may have an event source and an event handler to transfer data between UX objects. For example, an output port (outport) may return a selected item from a list. In one embodiment, a UX object includes inports and outputs, where an inport is connected to an outport. An outport is triggered by operations and exposes data, where an inport receives data and triggers further processing. FIG. 11 illustrates pseudo-code examples of the implementation of ports, for UX Object Template 1110, UX Object 1120, UX Application 1130, and Client Data 1140, respectively. With regard to Client Data 1140, ports are not exposed to the client, but the client triggers operations.

Dependencies may refer to relationships between the status of fields within and between UX objects. For example, an edit field may be enabled when changing status of a checkbox, or an address form may be offered that is custom to a selected country. Dependencies can exist between UX objects or within the same UX object. Dependencies can exist on the level of an object or on single fields. FIG. 12 illustrates pseudo-code examples of the implementation of dependencies, for UX Object Template 1210, UX Object 1220, UX Application 1230, and Client Data 1240, respectively. With regard to UX Object 1220, if a country is selected in the list, the related address format is set in the AddressForm. Availability of an operation is dependent on context. Regarding UX Application 1230, the address format is taken from the country and set to the form via the inport.

Facets are related information relevant to a leading object grouped in meaningful chunks. For example, a CRM Contact has facets such as Address and Contact Information, Activities, Interaction History, Relationships, etc. . . . . . Facets are driven by a data model based on the relations of a leading object. A facet can be seen as a structure within a system, where not only can UX objects reside side-by-side, but can be arranged into structures, embedding each other. An example of a multi-faceted object may be an Employee and related facets such as direct reports, payments, training history, etc.

UX objects may be embedded into other objects, such as a list of business cards or an organizational (org) chart. A master-detail relationship and a wizard or guided activity may also include a lead object with other embedded objects in a structure. UI components may be made up of facets as well as simple UX objects. FIG. 13 illustrates pseudo-code examples of the implementation of facets, for UX Object Template 1310, UX Object 1320, UX Application 1330, and Client Data 1340, respectively.

Actions are defined by a data model for the semantic object as functions of the business objects as defined in the platform, the UX object template as functions that are generic UI logic, and/or the UX object as function that are added to the abstract UI. Object actions occur in the context of a given object entity with focused semantics. For example, an action may be defined for 'Employee.promote( )'. Framework actions may be defined that are standard actions that might be enabled for all objects, or at least generally available and enabled based on roles. An example of a standard action is CRUD (Create, Read, Update, Delete). FIG. 14 illustrates pseudo-code examples of the implementation of actions, for UX Object Template 1410, UX Object 1420, UX Application 1430, and Client Data 1440, respectively.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method comprising:
receiving a semantic data object defining access in a service-oriented architecture (SOA) network of an enterprise to data content in a defined context, where the SOA network includes a backend enterprise server hosting a data store to provide data to enterprise frontend devices, the semantic data object a modeled object defining services to interact with data in different contexts, the semantic data object representing data content of the data store in the defined context via the services, the defined context having an associated access and navigation of the data content in the frontend;
associating a metadata description with the semantic data object to enrich the semantic data object by defining associations and access to the data content of the semantic data object, and by defining standard views that each define access to and navigation of the data content of the semantic data object for various usage scenarios for the defined context, where each of the standard views differently defines a user interface projection of selected technical characteristics of the data content of the semantic data object;
generating an enriched semantic data object having the associated metadata description and having service definitions defining access to the data content through a request to the enriched semantic data object as a service interface to the data content in a usage scenario;
exposing the enriched semantic data object as a service interface for the access to the associated data in the usage scenario, the enriched semantic data object to provide access to the data content in an associated view and navigation of the data object in response to a runtime access to the enriched semantic data object;
accessing a navigation pattern that defines a transition from one view to another view in response to a request for a function of a user interface incorporating the service interface; and
applying the navigation pattern at runtime of the enriched semantic data object to transition from one view of the user interface to another based on the associations described in the metadata description.

2. The method of claim 1, wherein generating the enriched semantic data object further comprises:
generating standardized methods for accessing the enriched semantic data object, the standardized methods accessible via service requests.

3. The method of claim 2, further comprising:
providing the service interface to a decoder of a user interface device, from which the decoder renders a runtime native representation of the data in the associated view on the user interface device, wherein the decoder makes requests to the service interface via the standardized methods.

4. The method of claim 1, further comprising:
placing the enriched semantic data object in a repository of enriched semantic data objects to create a library of reusable components for code development; and
providing the library of reusable components to enable incorporation of enriched semantic data objects with defined standard views and data access for accelerated development of applications based on the SOA network to abstract use of service interfaces from application development.

5. The method of claim 1, wherein the transition from one view to another view comprises a transition of one view of the semantic data object to another view of the semantic data object.

6. The method of claim 1, wherein the transition from one view to another view comprises a transition of one view of the semantic data object to a view of another semantic data object.

7. The method of claim 1, wherein transitioning from one view to another further comprises:
dynamically presenting different functionality based on the view.

8. The method of claim 1, further comprising:
binding the service interface to the data content at runtime of the enriched semantic data object.

9. The method of claim 8, wherein binding the service interface at runtime comprises:
dynamically changing a user interface at runtime based on an action or function selected in the user interface.

10. A computer implemented method comprising:
receiving a semantic data object defining access in a service-oriented architecture (SOA) network of an enterprise to data content in a defined context, where the SOA network includes a backend enterprise server hosting a data store to provide data to enterprise frontend devices, the semantic data object a modeled object defining services to interact with data in different contexts, each context having an associated access and navigation of the data;
enriching the semantic data object by associating a metadata description defining associations and access to and navigation of data content of the data store including methods for the enriched semantic data object, the metadata description including navigation pattern descriptions defining transitions among the data content including associated data content in response to requested methods on the enriched semantic data object; and
exposing the enriched semantic data object as a service interface for the access to the associated data content, the enriched semantic data object to provide the associated data content in response to a runtime access to the methods of the enriched semantic data object, to transition among views and contexts of the data content at runtime including the associated data content in accordance with the navigation pattern descriptions, and rendering a change corresponding to the transition to the user interface, including dynamically presenting functionality associated with the views and contexts.

11. The method of claim 10, wherein receiving the semantic data object comprises:
receiving a data object defined at least in part in context of how the data object is used.

12. The method of claim 11, wherein transitioning among views and contexts of associated data content comprises:
transitioning among views and contexts defined in the semantic data object.

13. The method of claim 10, wherein the SOA network defines access to data content via services.

14. The method of claim 10, wherein transitioning among views and contexts of associated data content comprises:
transitioning among views and contexts defined in associations described in the metadata description.

15. The method of claim 10, further comprising:
defining a template binding the enriched semantic data object to data content in a context for a user interface; and
generating a user interface component from the template.

16. A computer implemented method comprising:
receiving a semantic data object defining access in a service-oriented architecture (SOA) network of an enterprise to data content in a defined context, where the SOA network includes a backend enterprise server hosting a data store to provide data to enterprise frontend devices, the semantic data object a modeled object defining services to interact with data in different contexts, each context having an associated access and navigation of the data;
enriching the semantic data object by associating a metadata description defining associations and access to data content of the data store associated with the semantic data object, including defining methods for the enriched semantic data object related to the associated data content, the metadata description including navigation descriptions defining transition among the data content based on user interaction;
exposing the enriched semantic data object as a service interface for the access to the associated data content, the enriched semantic data object to provide the data content in response to a runtime access to the methods of the enriched semantic data object, where different technical aspects of the data content and methods are made available in the different contexts in accordance with the transitions;
providing a user interface component as a container for the enriched semantic data object; and
binding the data content to the enriched semantic data object in the user interface component at runtime of the container.

17. The method of claim 16, wherein exposing the enriched semantic data object comprises:
presenting facets of the semantic data object in the container, where each facet has an associated context, and defines associations of the semantic data object to other data content in the context, and wherein the facets viewable within the container is dynamically changeable at runtime.

18. The method of claim 16, wherein binding the data content at runtime comprises:
assigning a view to the semantic data object during enriching, and not defining a context of the view until runtime.

19. The method of claim 16, wherein binding the data content at runtime further comprises:
querying the enriched semantic data object for a view in a context related to a given type of view.

20. The method of claim 19, wherein querying the enriched semantic data object for the view in the context related to the given type of view comprises:
querying the enriched semantic data object for view type without specifying a context; and
receiving a default view of the view type in response to the query.

* * * * *